United States Patent
Trang et al.

(10) Patent No.: US 11,606,421 B2
(45) Date of Patent: Mar. 14, 2023

(54) EDGE COMPUTING RELOCATION

(71) Applicant: SONY CORPORATION, Tokyo (JP)

(72) Inventors: Linh Trang, Åkarp (SE); Svante Alnås, Lund (SE)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 16/761,475

(22) PCT Filed: Dec. 11, 2018

(86) PCT No.: PCT/SE2018/051282
§ 371 (c)(1),
(2) Date: May 4, 2020

(87) PCT Pub. No.: WO2019/117793
PCT Pub. Date: Jun. 20, 2019

(65) Prior Publication Data
US 2020/0366732 A1    Nov. 19, 2020

(30) Foreign Application Priority Data

Dec. 12, 2017    (SE) .................................... 1730342-1

(51) Int. Cl.
*H04L 67/1021*    (2022.01)
*H04W 4/50*    (2018.01)
(Continued)

(52) U.S. Cl.
CPC ........ *H04L 67/1021* (2013.01); *G06F 9/5088* (2013.01); *H04L 67/1001* (2022.05);
(Continued)

(58) Field of Classification Search
CPC ............... H04L 67/1021; H04L 67/289; H04L 67/1001; H04L 67/101; H04W 4/50;
(Continued)

(56) References Cited

U.S. PATENT DOCUMENTS

2011/0310865 A1* 12/2011 Kennedy ............... H04W 4/029
                                                                370/328
2014/0301365 A1* 10/2014 Weniger ................ H04L 41/147
                                                                370/331
(Continued)

FOREIGN PATENT DOCUMENTS

WO    2016128055 A1    8/2016
WO    2017100640 A1    6/2017
(Continued)

OTHER PUBLICATIONS

International Search Report from corresponding International Patent Application No. PCT/SE2018/051282, dated Mar. 8, 2019, 4 pages.

(Continued)

*Primary Examiner* — Gil H. Lee
*Assistant Examiner* — Chhian (Amy) Ling
(74) *Attorney, Agent, or Firm* — Tucker Ellis LLP

(57) ABSTRACT

A method of operating a terminal (130), comprising: transmitting, to a master control node (290) of an edge computing architecture (299), a configuration request message (7001), the configuration request message (7001) being indicative of at least one of a connectivity status of the terminal (130) indicative of an access network and a location of the terminal (130), receiving, from the master control node (290), a configuration response message (7002) indicative of an edge computing system (260-267), and executing an edge computing application (4001, 4002) using the edge computing system (260-267).

17 Claims, 18 Drawing Sheets

(51) Int. Cl.

| | |
|---|---|
| *G06F 9/50* | (2006.01) |
| *H04L 67/289* | (2022.01) |
| *H04W 4/02* | (2018.01) |
| *H04W 8/18* | (2009.01) |
| *H04L 67/101* | (2022.01) |
| *H04W 36/32* | (2009.01) |
| *H04W 36/00* | (2009.01) |
| *H04W 48/20* | (2009.01) |
| *H04L 67/1001* | (2022.01) |
| *H04W 36/14* | (2009.01) |

(52) U.S. Cl.
CPC .......... *H04L 67/101* (2013.01); *H04L 67/289* (2013.01); *H04W 4/02* (2013.01); *H04W 4/50* (2018.02); *H04W 8/18* (2013.01); *H04W 36/00835* (2018.08); *H04W 36/14* (2013.01); *H04W 36/32* (2013.01); *H04W 48/20* (2013.01)

(58) Field of Classification Search
CPC ... H04W 4/02; H04W 8/18; H04W 36/00835; H04W 36/14; H04W 36/32; H04W 48/20; H04W 36/0011; G06F 9/5088; G06F 9/5005; G06F 9/5027; G06F 2209/509
See application file for complete search history.

(56) References Cited

U.S. PATENT DOCUMENTS

| | | | | |
|---|---|---|---|---|
| 2015/0141019 A1* | 5/2015 | Bengtsson | ............ | H04W 28/08 455/440 |
| 2016/0050589 A1* | 2/2016 | Safavi | ................. | H04B 17/318 455/436 |
| 2016/0330746 A1* | 11/2016 | Mehrabanzad | ......... | H04L 67/10 |
| 2017/0118311 A1* | 4/2017 | Frydman | ............... | H04L 67/145 |
| 2018/0109590 A1* | 4/2018 | Rao | ....................... | H04L 67/289 |
| 2018/0183855 A1* | 6/2018 | Sabella | ................ | H04L 47/803 |
| 2019/0026450 A1* | 1/2019 | Egner | .................... | G06F 21/44 |
| 2019/0028934 A1* | 1/2019 | Rasanen | ............... | H04W 80/10 |
| 2019/0306766 A1* | 10/2019 | Ketyko | ................ | H04L 41/147 |
| 2019/0364492 A1* | 11/2019 | Azizi | ................... | H04W 48/16 |
| 2020/0296653 A1* | 9/2020 | Huang | ................. | H04W 40/24 |

FOREIGN PATENT DOCUMENTS

| | | |
|---|---|---|
| WO | 2017187011 A1 | 11/2017 |
| WO | 2017194619 A1 | 11/2017 |

OTHER PUBLICATIONS

Taleb, Tarik et al., "Follow-Me Cloud: When Cloud Services Follow Mobile Users," IEEE Transactions on Cloud Computing, Feb. 3, 2016, 14 pages.

Fang, Yonggang, "Mobile Edge Computing (MEC); End to End Mobility Aspects," ETSI GR MEC 018 V1.1.1, Oct. 18, 2017, 52 pages.

Nadembega, Apollinaire et al., "Mobility prediction model-based service migration procedure for follow me cloud to support QoS and QoE," 2016 IEEE International Conference on Communications (ICC), May 27, 2016, 6 pages.

Clark, Christopher et al., "Live migration of virtual machines," Proceedings of the 2nd conference on symposium on networked systems design & implementation, USENIX Association, May 2, 2005, 14 pages.

"Mobile Edge Computing (MEC); Framework and Reference Architecture," ETSI GR MEC 003 V1.1.1, Mar. 26, 2016, 18 pages.

"Mobile Edge Computing (MEC); Technical Requirements," ETSI GS MEC 002 V1.1.1, Mar. 31, 2016, 40 pages.

Swedish Search Report from corresponding Swedish Patent Application No. 1730342-1, dated Jun. 29, 2018, 3 pages.

\* cited by examiner

EDGE COMPUTING RELOCATION

TECHNICAL FIELD

Various examples of the invention generally relate to edge computing. Various examples of the invention specifically relate to a master control node for facilitating interoperability and mobility between multiple edge computing systems.

BACKGROUND

European Telecommunications Standards Institute (ETSI) industry specification group (ISG) on multi-access edge computing (MEC; sometimes also mobile edge computing) aims to provide information technology (IT) and cloud-computing capabilities close to the edge of a network, e.g., at the access network (AN) of a network. Due to the close proximity between MEC hardware such as MEC servers and the user equipment (UE; or terminal), MEC facilitates low latency applications. MEC is an example implementation of edge computing (EC). EC facilitates low-latency EC applications.

MEC is described in Mobile-Edge Computing—Introductory Technical White Paper, September 2014 (Contributors: Huawei, IBM, Intel, Nokia Networks, NTT DOCOMO, Vodafone), which is hereby incorporated herein by reference in its entirety by cross-reference. MEC is further described by ETSI ITS (14)01_038: ISG MEC #1 Minutes of Plenary Meeting, which is also hereby incorporated herein by reference in its entirety.

For example, due to the mobility of the terminal, relocation of applications or user context between different MEC servers may be required. Such relocation between servers within an edge computing system is e.g. generally discussed in WO2017/100640A1.

For example, due to user mobility, the MEC system may detect that the current MEC server executing the MEC application as a host (source MEC server) is not optimal and may need to relocate—sometimes also referred to as migrate—the MEC application or the user context to a new MEC server (target MEC server). The target MEC server may be more appropriate in terms of, e.g., geographical location, load balancing, latency etc. if compared to the source MEC server. For facilitating such relocation in view of UE mobility, sometimes a control node of the MEC system—also referred to as orchestrator node—is employed. The control node may track mobility of the UE and may control the relocation, e.g., to avoid or reduce impacts on the user experience associated with the application. Generally, the control node—beyond mobility management—may be responsible for further control functionality.

Such a reference implementations of mobility control in MEC systems face certain restrictions and drawbacks. Specifically, scenarios may occur where inter-MEC system relocation may become necessary, i.e., where a relocation of the MEC application from a source MEC system to a target MEC system is required. Then, interoperability between the source MEC system and the target MEC system may be limited according to the reference implementations and policy is also missing in reference implementations. From this, increase latency and decreased user experience when application performing the inter-MEC system relocation may result.

More generally, scenarios are conceivable in which a UE has the capability of connecting to multiple MEC systems. Then, according to reference implementations, it can be difficult to select the appropriate MEC system.

SUMMARY

Therefore, a need exists for advanced EC techniques. Specifically, a need exists for EC techniques which overcome or mitigate at least some of the above-identified restrictions and drawbacks.

This need is met by the features of the independent claims. The features of the dependent claims define embodiments.

According to a first aspect, a method of operating a terminal is provided, comprising:
transmitting, to a master control node of an edge computing architecture, a configuration request message, the configuration request message being indicative of at least one of a connectivity status of the terminal indicative of an access network and a location of the terminal,
receiving, from the master control node, a configuration response message indicative of an edge computing system, and
executing an edge computing application using the edge computing system.

The purpose of the configuration request message may be the UE requesting network assistance in identifying the most appropriate EC system from a plurality of EC systems. The configuration response message may be the response to the configuration request message. The configuration response message may then be indicative of the most appropriate EC system. This may be helpful in scenarios where multiple EC systems would be generally available to the UE. The configuration response message may provide for a UE configuration in terms of which one of the plurality of EC systems to use for executing the EC application. For example, the configuration request message and/or the configuration response message may be transmitted using an AN of a network. The EC system may be associated with the AN; e.g., may have one or more EC servers co-deployed at the AN or close to the AN.

For example, the connectivity status may be indicative of the network and/or one or more further networks in range of the UE. The connectivity status may be indicative of access networks in range of the UE. For example, the connectivity status may be indicative of any EC systems associated with the network and/or the one or more further networks in range of the UE. For example, the location may be specified in terms of a cell identity of a cell of the network. For example, the location may be specified in terms of an identity of the network. E.g., a country code, operator code, network name, etc. may be used.

For example, the configuration response message may be indicative of the EC system by means of an identifier and/or an address of a proxy node of the EC system. Then, the method may further include setting up the EC application by control signaling with the proxy node. The setup of the EC application may be in accordance with reference implementations, e.g., a general MEC concept. The setting up of the EC application may include connection to the EC system.

Different EC systems may be distinguished from each other by different proxy nodes, i.e., proxy nodes using different addresses. Typically, each EC system includes one or more EC servers in the user plane; and one or more local control nodes in the control plane. For example, a local control node may implement mobility management.

The EC application may include use of hardware and/or software resources at the UE. The EC application may include use of hardware and/or software resources at one or more EC servers of the EC system. The EC application may include communication of uplink user data transmitted by the UE and received by the one or more EC servers. The EC application may include communication of downlink user data transmitted by the one or more EC servers and received by the UE. The EC application may include application executables to be executed by the UE and/or application executables to be executed by a EC server of the EC system.

In some examples, it may be possible that the configuration response message is indicative of a plurality of EC systems, including the EC system. Then, the method may further include selecting the EC system from the plurality of EC systems. For said selection at the UE, various decision criteria may be taken into account, e.g., a channel quality of communicating with ANs associated with the plurality of EC systems, etc.

By such techniques, selection of the most appropriate EC system from a plurality of EC systems can be facilitated. This may be in the context of an inter-EC system relocation.

In various embodiments, the configuration request message is indicative of a predicted future connectivity status of the terminal, wherein the predicted future connectivity status is indicative of at least one of an access network to become in range of the terminal and a predicted future location of the terminal. The application may report which connectivity that is possible to use to access the application to the master controller. This could for example be that a certain application is supporting a specific PLMN or an list of SSID's or an geographical area. This reporting could for example be done by the application at instantiation or startup. Before a new connectivity is expected to be used, the terminal may request thereby initiate an evaluation as to whether the terminal should be served by a different EC system than a current one, if and when the new connectivity status is obtained. This is an optimization compared to when the terminal has already changed its connectivity. By starting the discovery procedure, including e.g. policy evaluation, security procedures etc., prior the connectivity change, latency can be improved. This may particularly be beneficial when different connectivity types or access technologies are involved, e.g. between a wi-fi AN and a cellular AN. This will also make a significant difference if the EC application has a user context that needs to be relocated before a new EC system is able to service the terminal.

In one embodiment, the method comprises determining said predicted future connectivity based on stored data indicative of historic connectivity or position of the terminal. This way, a current situation, such as a position and/or connectivity and/or point in time, such as a time of day, may be detected, recognized and mapped to a historic situation, which preceded a subsequent established connectivity. Preparation for relocation of the application to that subsequent established connectivity may then be initiated, such that fast relocation may be obtained once an AN associated with that connectivity is detected.

In one embodiment, the configuration request message is indicative of at least one of a present connectivity status of the terminal and one or more access networks in range of the terminal.

According to a second aspect, a method of operating a master control node of an edge computing architecture is provided, comprising:
    receiving, from a terminal, a configuration request message, the configuration request message being indicative of at least one of a connectivity status of the terminal indicative of an access network and a location of the terminal,
    based on the configuration request message:
    selecting an edge computing system from a plurality of candidate edge computing systems, and
    transmitting, to the terminal, a configuration response message indicative of the selected edge computing system.

Thereby, selection of the most appropriate EC system can be facilitated.

In one embodiment, the method further comprises:
    updating a registry of the plurality of candidate edge computing systems based on control signaling with the plurality of candidate edge computing systems.

In one embodiment, the control signaling comprises at least one of: one or more supported connectivity statuses of terminals using the respective edge computing system; a location of the respective edge computing system; one or more access networks associated with the respective edge computing system; and one or more edge computing applications supported by the respective edge computing system.

In one embodiment, the configuration request message is indicative of a predicted future connectivity status of the terminal, wherein the predicted future connectivity status is indicative of at least one of an access network to become in range of the terminal and a predicted future location of the terminal.

In one embodiment, the method further comprises:
    receiving, from a source edge computing system, context information (7101) of an edge computing application (4001, 4002) executed by the terminal (130) using the source edge computing system different from the selected edge computing system, and
    transmitting, to the selected edge computing system, the context information.

In one embodiment, the method further comprises:
    receiving, from a source edge computing system or the terminal, a token of context information of an edge computing application executed by the terminal using the source edge computing system different from the selected edge computing system, and
    transmitting, to the selected edge computing system, the token.

Thereby, low-latency inter-EC system relocation of an EC application is facilitated.

In one embodiment, the method further comprises:
    transmitting, to the selected edge computing system being the access network to become in range of the terminal, an instruction to prepare a shadow instance of an edge computing application for execution by the terminal, based on the configuration request message.

In one embodiment, the method further comprises:
    providing, to the selected edge computing system, context information of said edge computing application currently executed by the terminal using a source edge computing system different from the selected edge computing system.

In one embodiment, the method further comprises:
    receiving said context information from the source edge computing system, and
    transmitting the context information to the selected edge computing system.

In one embodiment, providing includes:
    receiving a token of said context information from the source edge computing system or the terminal, and
    transmitting the token to the selected edge computing system.

In one embodiment, the context information comprises at least one of: control data of the edge computing application; user data of the edge computing application; a user context of a user of the edge computing application; and a session context of the edge computing application.

In one embodiment, the edge computing system is selected further based on a preconfigured policy.

In one embodiment, the policy comprises a security rule.

In one embodiment, the policy comprises an authorization rule defining access rights to edge computing systems for a plurality of subscribers.

In one embodiment, at least one of the configuration request message and the configuration response message is indicative of a service identity of the edge computing application.

In one embodiment, the configuration request message is indicative of one of one or more networks available to the terminal.

According to a third aspect, a method of operating a local control node of an edge computing system is provided, comprising:
registering or de-registering the local control node at a master control node by control signaling with the master control node. Thereby, an up-to-date registry at the master control node may be facilitated.

According to a fourth aspect, a terminal is provided, comprising control circuitry configured to perform:
transmitting, to a master control node, a configuration request message, the configuration request message being indicative of at least one of a connectivity status of the terminal indicative of an access network and a location of the terminal,
receiving, from the master control node, a configuration response message indicative of an edge computing system, and
executing an edge computing application using the edge computing system.

According to a fifth aspect, a master control node of an edge computing architecture is provided, comprising control circuitry configured to perform:
receiving, from a terminal, a configuration request message, the configuration request message being indicative of at least one of a connectivity status of the terminal indicative of an access network and a location of the terminal,
based on the configuration request message:
selecting an edge computing system from a plurality of candidate edge computing systems, and
transmitting, to the terminal, a configuration response message indicative of the selected edge computing system.

The master control node may also be referred to as global control node, because it may not be tied to a specific EC system, but rather coordinate interoperability between multiple EC systems and contain policy and access rights for a specific EC application. The master control node could also be referred to as master orchestrator.

According to a sixth aspect, a local control node of an edge computing system is provided, comprising control circuitry configured to perform:
registering or de-registering the local control node at a master control node by control signaling with the master control node.

Thereby, an up-to-date registry at the master control node may be facilitated.

A computer program or computer program product includes program code. The program code may be executed by a processor. Executing the program code may cause the processor to perform a method of operating a local control node of an EC system including registering the local control node at a master control node by control signaling with the master control node.

It is to be understood that the features mentioned above and those yet to be explained below may be used not only in the respective combinations indicated, but also in other combinations or in isolation without departing from the scope of the invention.

DETAILED DESCRIPTION OF EMBODIMENTS

Figure 1:
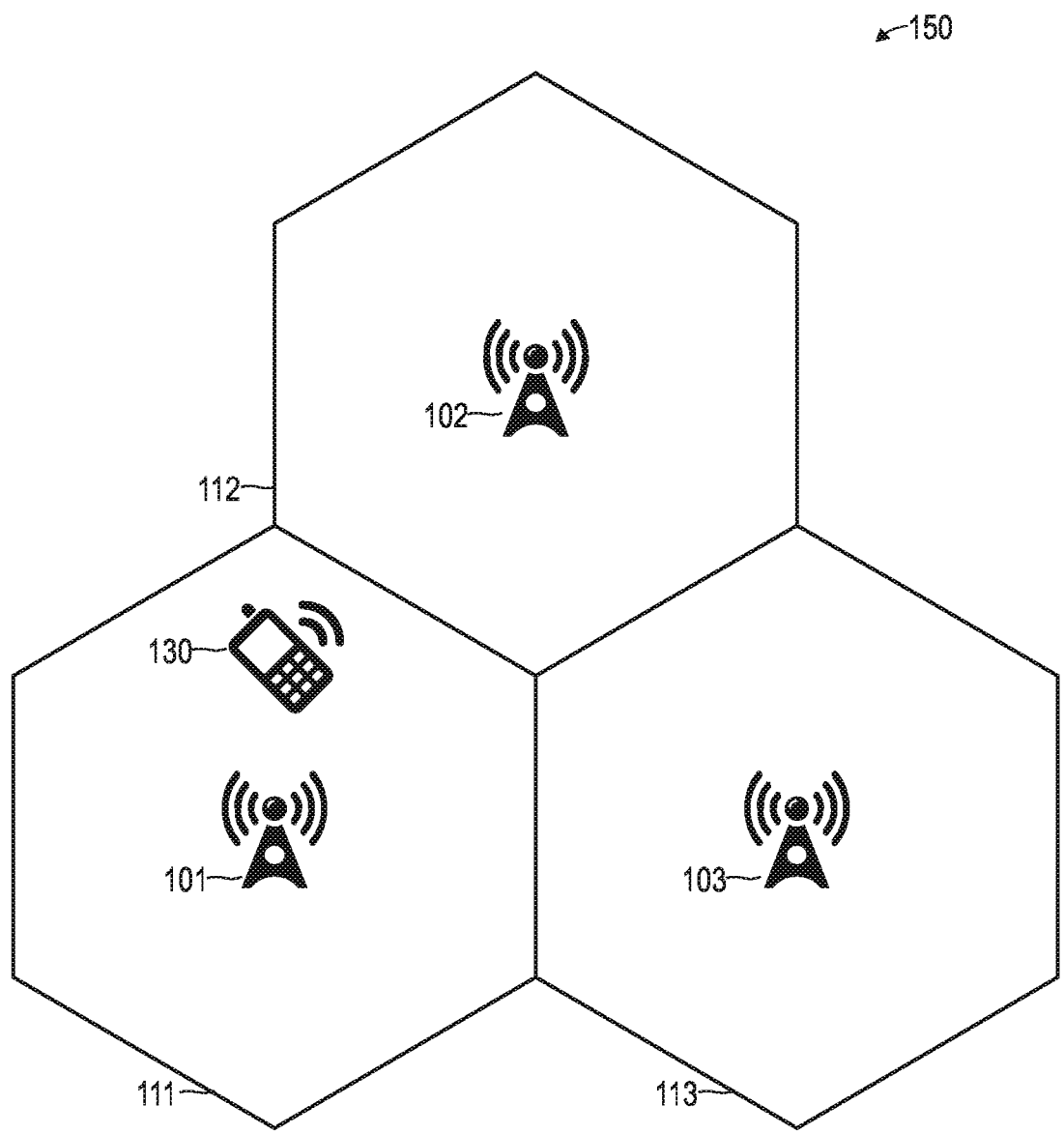
FIG. 1 schematically illustrates a radio access network of a cellular network according to various examples.

In the following, examples of the invention will be described in detail with reference to the accompanying drawings. It is to be understood that the following description of examples is not to be taken in a limiting sense. The scope of the invention is not intended to be limited by the examples described hereinafter or by the drawings, which are taken to be illustrative only.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Hereinafter, techniques of EC are described. EC can facilitate providing ultra-low latency applications to UEs. An EC system providing EC applications is often associated with access nodes such as base stations or access points of a wireless network. An example of a wireless network is a cellular network. For example, EC often relies on deployment of EC servers on which an EC application is executed within a RAN or close to equipment of a RAN of a cellular network. For example, the EC servers may be co-located with base stations of the RAN. EC systems may also be implemented for fixed-wire networks. For example, the EC servers may be operated by the same operator as the associated network. For example, the EC servers may have a high-throughput backbone connection to the AN. For example, the EC servers may offer applications such as cloud-based computing. The EC applications offered by the EC servers to a UE may benefit from low latency. For example, the latency may be less than 30 ms, optionally less than 10 ms. Due to such low latency, latency-sensitive applications may be provided. For example, the EC applications may relate to server-based gaming or augmented reality.

An example use case for an EC system includes VR 3D applications hosted by the EC server; such techniques may enable VR applications also on simpler UEs, such as lower end mobile phones. VR typically requires a very low latency feedback loop between the user input, e.g., moving the head, and the rendered VR 3D frames being shown on the display, e.g., the display in VR glasses. Preferably the total system round trip latency should be less than 10 ms. The EC servers, being placed closer to the users, have the potential to enable low latency applications such as VR.

A further example use case for an EC system includes videoconference applications hosted by the EC server. Other EC application may not be low-latency related and may rather focusing on, e.g., reducing bandwidth etc.

In some examples, the EC servers together with a local EC control node implement an EC system. An EC system may have one or more proxy nodes that facilitate access by UEs. For example, the EC control node may perform control functionality with respect to the EC servers.

Such control functionality may include: facilitating and, in particular, triggering relocation of applications between the EC servers of the EC system, i.e., from a source EC server to a target EC server; load balancing; deployment of additional EC servers; etc.

According to various techniques described herein, interoperability between multiple EC systems is facilitated. This may be helpful when a UE may select between multiple EC systems. Also, this may be helpful for inter-EC system relocation of EC applications. Here, service continuity is facilitated.

According to examples, this is achieved by employing a master control node—which may also be referred to as global control node or master orchestrator node. The master control node may facilitate selection of the appropriate EC system. For this purpose, one-way or two-way control signaling between the UE in need for selecting an EC system and the master control node may be implemented. The master control node may maintain a registry of a plurality of candidate EC systems. The registry may be maintained up-to-date by means of one-way or two-way control signaling between the master control node and the candidate EC systems.

Then, the master control node is in a position to select the appropriate EC system from the plurality of candidate EC systems, in accordance with the registry entries. The master control node may then signal an indicator indicative of the selected EC system, e.g., using the address of the respective proxy node.

As a general rule, the master control node may be associated with the respective subscriber of a UE. Hence, the master control node may assist in selection of the appropriate EC mobility control nodes for different EC applications being executed by the UE. Alternatively or additionally, the master control node may be associated with one or more specific EC applications. Then, in principle, different master control nodes may assist in selection of the appropriate EC mobility control nodes for different EC applications being executed by the UE.

The master control node may be provided and hosted by the vendor for its own EC applications. Here, each EC application—which may also be referred to as client of the master control node—may have knowledge on its associated and responsible master control node.

Hence, there may be a subscriber:master control node correspondence; and/or a EC application:master control node correspondence.

The master control node may be able to provide the UE with the optimum EC system. Hence, corresponding selection logic may be situated at the master control node.

The master control node may also co-implement the functionality of the respective EC local control node of the selected EC system; or there may be a distinct EC local control node provided for the selected EC system.

An example scenario as described below.

Each time an EC application is installed or removed from an EC system, the respective EC system—e.g., the responsible local control node—provides a respective update to the master control node. An onboarding control message or an offboarding control message may be transmitted. This may correspond to registering or de-registering the respective EC system.

This may facilitate an up-to-date registry at the master control node. A registry entry of the registry may show the current status according to the update provided to the master control node. According to some examples, this registration procedure may include exchange of filter information. The filter information may correspond to supported connectivity states of UEs that may connect to the respective EC system. The master control node may maintain a registry of the plurality of candidate EC systems; here, it may be specified where, e.g., at which EC systems, a specific EC application is installed and under which network conditions/connectivity statuses the respective EC systems are accessible.

Each time execution of a EC application commences—i.e., when the EC application is started, e.g., due to user action, etc.—, the respective UE contacts the responsible master control node. For this, a configuration request message may be transmitted by the UE and received by the master control node. This configuration request message requests assistance in configuring the EC application. Specifically, it requests an indication of one or more EC systems that may be suitable in connection with the execution of the EC application. Various information elements may be included in the configuration request message. For example, the configuration request message may be indicative of a connectivity status and/or of a location of the UE. For example, respective runtime parameters that are repetitively updated at the UE may be included in the configuration request message. This may help to filter out inappropriate candidate EC systems at the master control node. For example, the configuration request message may include a service identity of the EC application. As a general rule, the service identity may uniquely discriminate the EC application against other EC applications.

As such, the service identity may be a unique identifier of the EC application. As a further example, the configuration request message may include an identity of a subscriber associated with the UE. This may help the master control node to identify appropriate policies in selection of the EC mobility control node. Further, the configuration request message may include the requirement specification for the candidate EC mobility control nodes by the UE. Then, the master control node may return, to the UE, the most suitable EC system, in view of the current availability. For this, the master control node selects the respective EC system from a plurality of candidate EC systems, e.g., included in a registry maintained at the master control node. A respective configuration message which is indicative of the selected EC system may be transmitted by the master control node and then received by the UE.

After a while—e.g., due to UE mobility such as change of Internet Protocol address or inter-EC system mobility—, the UE may send a new configuration request message to the master control node, thereby facilitating re-selection of the EC system.

As the general rule, various trigger criteria for transmitting the configuration request message are conceivable, including, but not limited to: commencing execution of the EC application at the UE; and/or a predefined repetitive timing schedule; and mobility of the UE such as inter-EC system mobility or intra-EC system mobility; detection of congestion or increased latency when executing the EC application.

A vendor may co-deploy the master control node and a local control node, e.g., if the UE does not have any connectivity to a further local control node.

As a general rule, various decision criteria are available for selecting the EC system from a plurality of candidate EC systems. Parameters on which the selection may be based include, but are not limited to: Mobile Country Code (MCC), Mobile Network Code (MNC), current MCC (CMCC), and current MNC (CMNC) indicated by the UE with respect to available ANs. MCC, MNC, CMCC, and/or CMNC may be used to specify the connectivity status and/or the location of the UE. Such parameters may be used to identify the location of the UE, and—e.g., in combination with the service set id (SSID) of a WLAN network—distinguish between ambiguities of the available wireless networks. The IP address of the UE could also be used in the selection criteria. The IP address may not be sent as parameter sine it is already included in the request.

Techniques described herein facilitate low-latency selection of the appropriate EC system.

Load balancing and traffic shaping becomes possible. UE mobility is efficiently supported, e.g., in case of inter-EC system mobility. Further, access restrictions may be implemented in accordance with policies.

As will be appreciated from the above, an EC architecture is described in which EC systems have the ability to communicate with a master control node that is not tied to an individual EC system. Rather, the master control node can provide coordination on UE-level and/or EC application-level, without a strict one-to-one correspondence to a specific EC system.

The master control node may specifically assist the UE in the selection of the appropriate EC system. Alternatively or additionally to such selection functionality of the appropriate EC system, the master control node may also provide other or further functionality. For example, the master control node may not only assist the UE, but may, alternatively or additionally, assist local control nodes of EC systems and/or EC servers of the EC systems with respect to certain functionality: A respective example scenario includes migrating context information of an EC application. This context information may be migrated from a source EC system to a target EC system. The context information may be provided to a local control node and/or an EC server of a target EC system in inter-EC system relocation. Such context information may be required to commence execution of the EC application. The context information may be provided by relaying through the master control node; or may be provided directly from the source EC system to the target EC system using an associated token which is handled by the master control node.

As a general rule, the context information may include payload data/user data of the EC application. The context information may, alternatively or additionally, include control data of the EC application. For example, the context information may include a user context and/or a session context. The user context may differ from user to user of a multi-user EC application.

Differently, the session context may not differ or only partly differ from user to user of a multiuser EC application. The context information may include data or may include a pointer to data; in latter case, the data may be fetched from a database based on the pointer. An example of a user context includes, for a gaming EC application: a user location in a level of the game; avtar-related information of an avatar of the user in the game. An example of a session context includes, for a gaming EC application: a current level of the game; a current rule set of the game; etc. An example of a user context includes, for an office EC application: text of a current document edited by the office application.

In some scenarios, the context information may implement a snapshot of the EC application.

The snapshot may correspond current RAM data of the EC application. The snapshot may implement a complete copy of runtime data of the EC application. As will be appreciated from the above, the master control node may relay the context information between EC systems.

Different scenarios are available for assisting in transfer of the context information between EC systems. In a first scenario, the context information is created when a UE commences execution of the EC application. Then, a respective token—also referred to as key—is created. The token may be stored at the master control node and/or the current local control node handling the mobility of the EC application and/or the UE and/or an EC server executing the EC application. Then, when the EC application has relocated from the source EC system to the target EC system, an EC application instance relocation is required. This includes transfer of the context information from the source EC system to the target EC system. According to examples, this transfer is facilitated by the master control node. Specifically, it would be possible that the master control node provides the target EC system—e.g., a target EC server of the target EC system and/or a local control node of the target EC system—with the context information or, at least, with the token for retrieval of the context information. Then, the target EC system may use the token to fetch the context information from the source EC system. As such, the token may be indicative of the source EC system. The target mobile system may retrieve the token from the UE or master control node. In a scenario where direct transfer of the context information from the source EC system to the target EC system is not possible, the context information can also be relayed via the master control node. Here, the context information is initially transferred to the master control node and after that to the target EC system. The target EC system or the master control node may be required to retrieve the token from the source EC system or the UE.

FIG. 1 illustrates aspects with respect to the cellular network. In particular, FIG. 1 illustrates aspects with respect to a RAN 150 of the cellular network. In the example of FIG. 1, three base stations 101-103 form the RAN 150. In other examples, a larger number of base stations could be used.

While various examples are described herein in the context of cellular networks, respective techniques may also be applied for other types of networks, e.g., ad-hoc wireless networks or fixed-wire networks.

Example implementations include 3GPP-specified networks such as 4G or 5G and WLAN or LAN.

The base station 101 serves a cell 111 of the cellular network. As such, the base station 101 is sometimes referred to as serving base station for UEs 130 located within the cell 111 and connected with the cellular network via the base station 101. The base station 102 serves and adjacent cell 112. Also, the base station 103 serves an adjacent cell 113.

Due to mobility of the UE 130, the UE 130 may at one point come close to the cell edge of the cell 111. Typically, in such a cell edge scenario, the quality of communicating on a radio channel between the UE 130 and the base station 101 deteriorates. For example, at one point the quality of communicating on the radio channel may fall below a certain threshold. This may be due, e.g., the UE 130 moving away from the base station 101 and towards the base station 102. Then, a handover from the initially serving base station 101—which, in the context of the handover is often referred to as the source base station—to the base station 102 (target base station) may occur. Once the handover is completed, the UE 130 is connected with the cellular network via the base station 102, which is then the new serving base station. Handovers, or generally the mobility of the UE 130, can be one example why a relocation of the EC application can be required.

Figure 2:
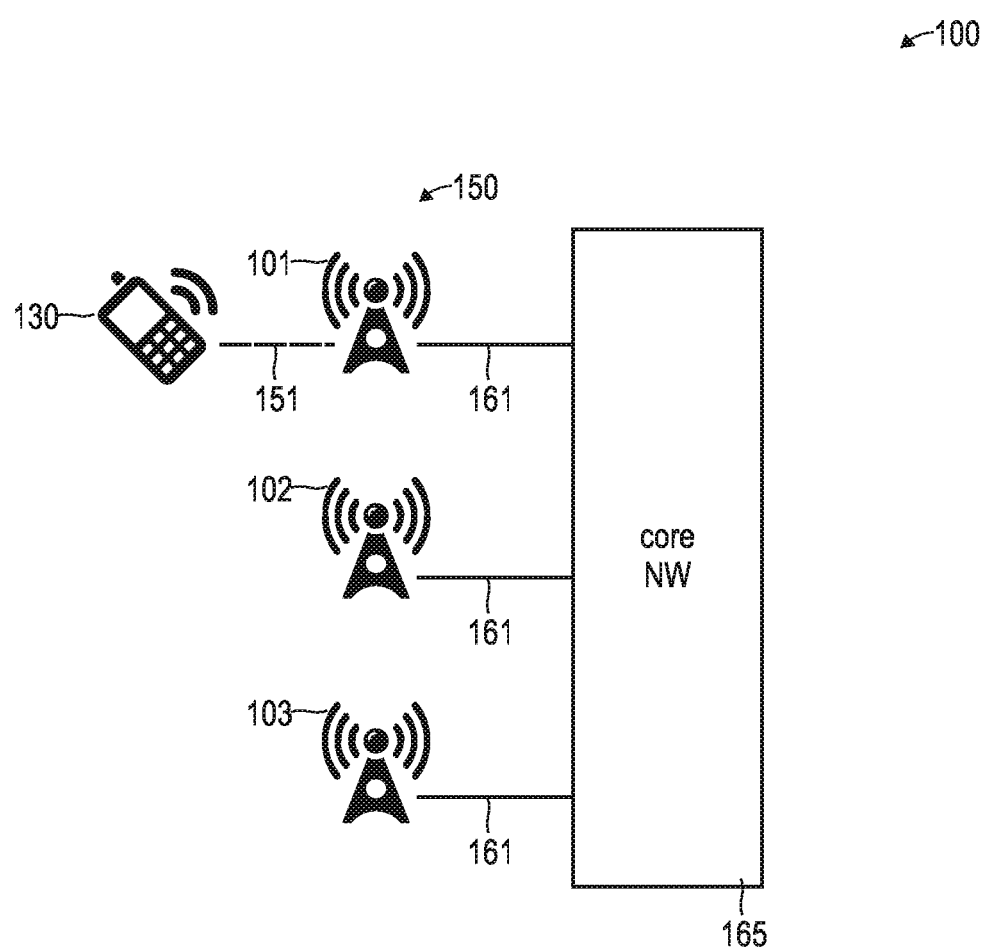
FIG. 2 schematically illustrates the cellular network of FIG. 1 in greater detail.

FIG. 2 illustrates aspects with respect to the cellular network 100. In FIG. 2, the wireless link 151 via which the UE 130 is communicating with the base station 101 is illustrated. The communication on the wireless link 151 can be bidirectional including downstream communication from the base station 101 to the UE 130 and upstream communication from the UE 130 to the base station 101.

FIG. 2 illustrates a core network 165 of the cellular network 100. The base stations 101-103 are connected by core network interfaces 161 with each other and the core network 165.

For example, the cellular network 100 can be a 3GPP specified cellular network such as 2G, 3G, 4G, or upcoming 5G. For example, in the context of 3GPP 4G Long Term Evolution (LTE) cellular networks 100, the radio access network 150 is sometimes referred to as evolved Universal Mobile Telecommunications System Terrestrial Radio Access (E-UTRAN). Further examples include a 3GPP Narrowband Internet of Things (NB-IoT) or Machine Type Communication network. The techniques described herein with respect to EC are not limited to cellular networks. Techniques of EC is described herein may be readily applied to other kinds and types of networks. Other examples include Institute of Electrical and Electronics Engineers (IEEE)—specified networks, e.g., according to the 802.11x Wi-Fi protocol or the Bluetooth protocol or LAN.

Figure 3:
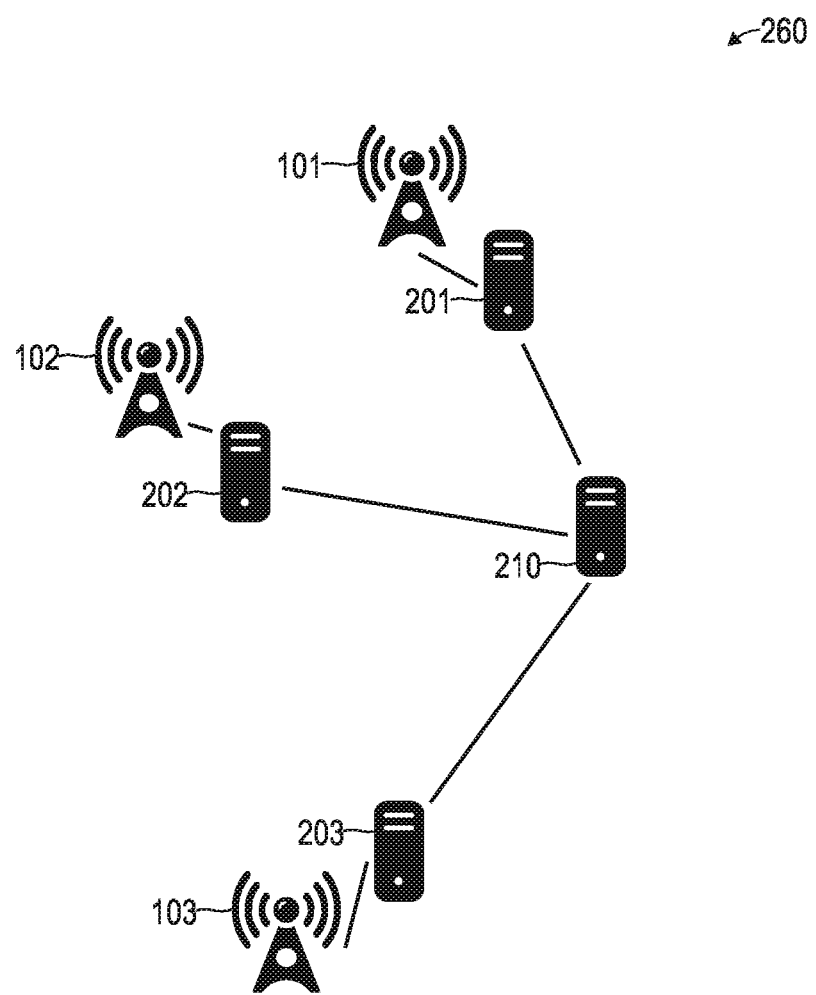
FIG. 3 schematically illustrates an EC system associated with the cellular network according to various examples.

FIG. 3 illustrates aspects with respect to an EC system 260. The EC system 260 is associated with the RAN 150 of the network 100. The EC system 260 includes EC servers 201-203. The EC server 201 is associated with the base station 101; the EC server 202 is associated with the base station 102; and the EC server 203 is associated with the base station 103.

Applications hosted by a given one of the UE servers 201-203 are typically provided to UEs connected to the respectively associated base station 101-.103.

While in the example of FIG. 3 there is a one-to-one correspondence between EC servers 201-203 and base stations 101-103, in other examples, it is also possible that more than a single base station 101-103 is associated with a given EC server 201-203.

For example, the EC servers 201-203 could be co-located at the same site as the associated base station 101-103. By deploying the EC servers 201-203 in or close to the RAN 150, a comparably low latency for communicating between the EC servers 201-203 and the associated base stations 101-103 may be achieved. For example, the latency of communicating between a given EC server 201-203 and the associated base station 101-103 may be below 30 milliseconds, preferably below 10 microseconds, more preferably below 1 microsecond. Sometimes, such a dimensioning of the latency is also referred to as ultra-low latency.

Control of the EC system 260 is provided by an EC control node 210. The EC control node 210 is responsible for the EC system 260 only and not responsible for further EC systems.

Hence, the Local control node 210 may be referred to as local control node. For example, the local control node 210 can perform tasks of load balancing between the various EC servers 201-203. For example, the local control node 210 can keep track of a computational load imposed to the various EC servers 201-203. For example, the local control node 210 can control relocation of EC applications between the various EC servers 201-203 and, hence, implement mobility management.

For example, the local control node 210 can perform tasks with respect to relocating an application from a source EC server 201-203 to a target EC server 201-203 of the EC system 260. For example, relocation of the EC application may be triggered due to mobility of the UE to which the EC application is provided. For example, relocation of the EC application may be due to a handover between cells 111-113 of the radio access network 150 of the cellular network 100.

For example, relocation of the EC application may be triggered due to load balancing.

Such mobility scenarios correspond to intra-EC system mobility. The relocation of the EC application is within the EC system 260. Other scenarios are conceivable where the relocation of the EC application is not restricted to the EC system 260. Such mobility scenarios correspond to inter-EC system mobility. According to examples, inter-EC system mobility is facilitated by a master control node. Differently from the local control node 210, the master control node is associated with a plurality of EC systems.

Figure 4:
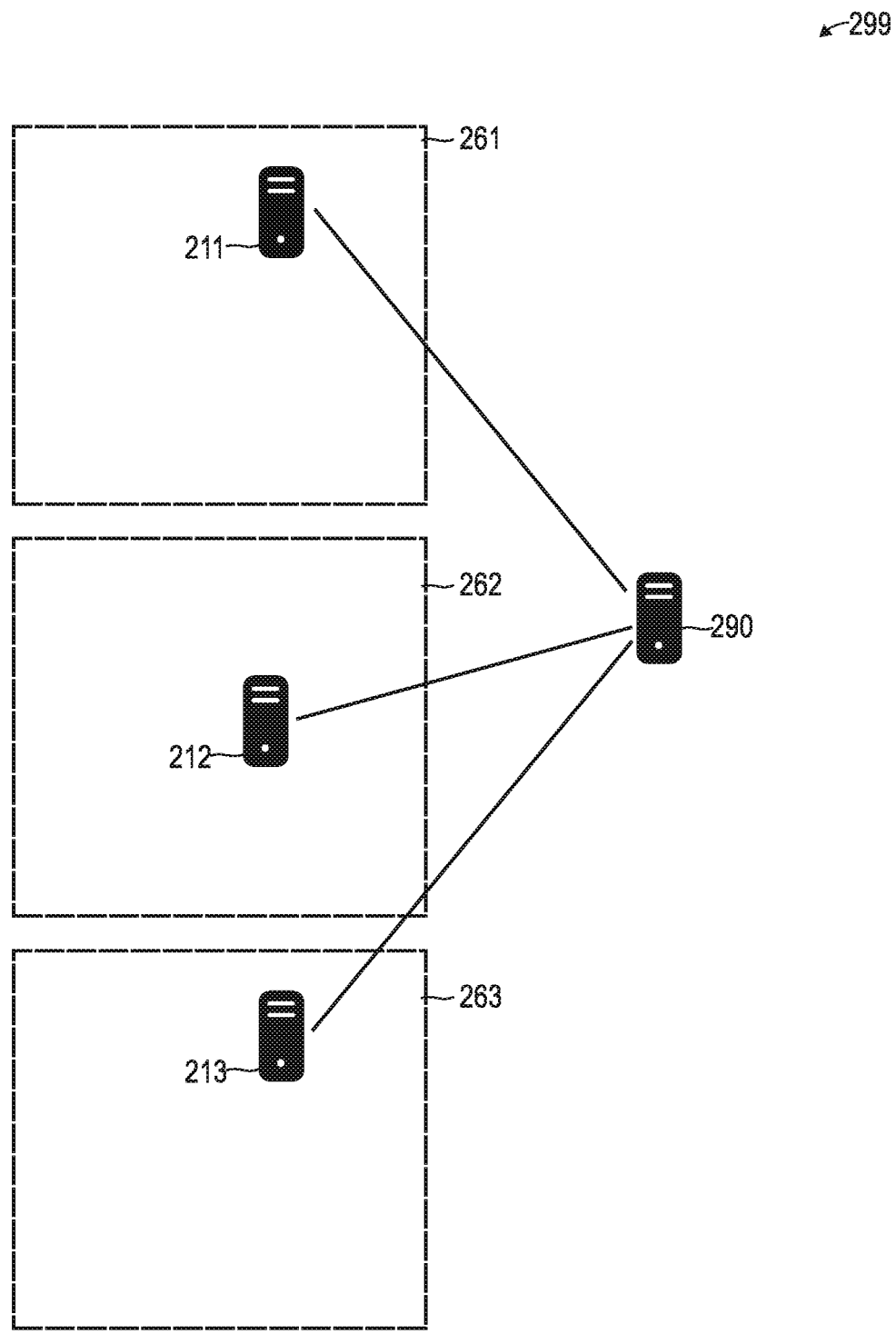
FIG. 4 schematically illustrates multiple EC systems and a master control node of an EC architecture according to various examples.

FIG. 4 illustrates aspects with respect to an EC architecture 299. The EC architecture 299 includes a master control node 290. The master control node 290 is not fixedly tied to one of the multiple EC systems 261-263 illustrated in FIG. 4. Rather, the master control node 290 has the ability to communicate with multiple EC systems 261-263. While in FIG. 4 a scenario is illustrated in which the master control node 290 communicates with local control node 211-213 associated with the EC systems 261-263, alternatively or additionally, it would be possible that the master controller 290 can communicate with EC servers of the EC systems 261-263 and/or the UE 130 (the EC servers and the UE 130 are not illustrated in FIG. 4 for sake of simplicity).

Specifically, according to examples described herein, the master control node may maintain a registry of the EC systems 261-263. Thereby, selection of the appropriate EC system from the plurality of EC systems 261-263 by the UE 130 can be facilitated by the master control node 290. The registry may be indicative of the capability of each EC system 261-263, e.g., in terms of supported EC applications, supported connectivity statuses of UEs attempting to connect to the respective EC system 261-263, etc.

Figure 5:
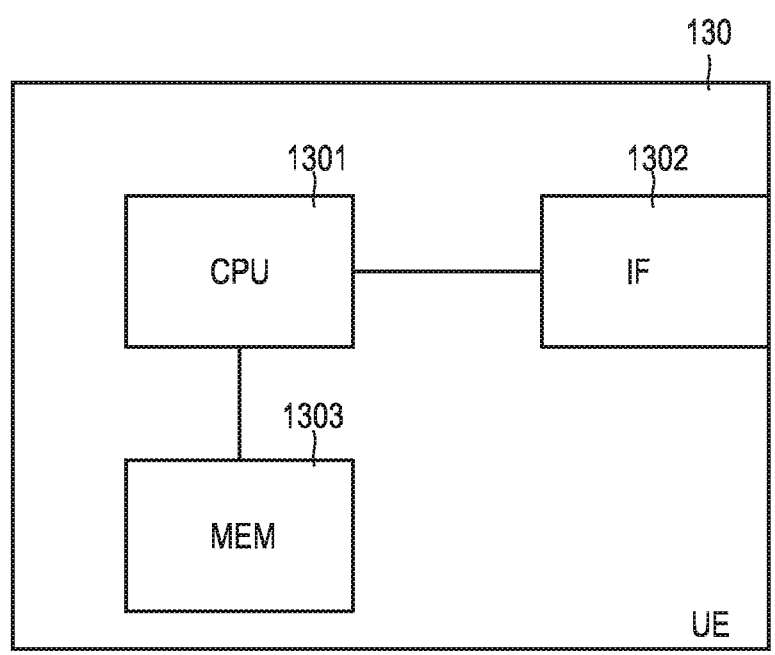
FIG. 5 schematically illustrates a UE according to various examples.

FIG. 5 illustrates aspects in connection with the UE 130. The UE 130 includes control circuitry implemented, in FIG. 5, by a processor 1301, an interface 1302, and a memory 1303.

Communication with other nodes is possible via the interface 1302. Program code can be stored in the memory 1303 and then be executed by the processor 1301. Executing the program code causes the processor 1301 to perform techniques as described herein, e.g.: executing an EC application using an EC system; control signaling with a master control node and/or a local control node; performing intra-EC system mobility; performing intra-EC system mobility; etc.

Figure 6:
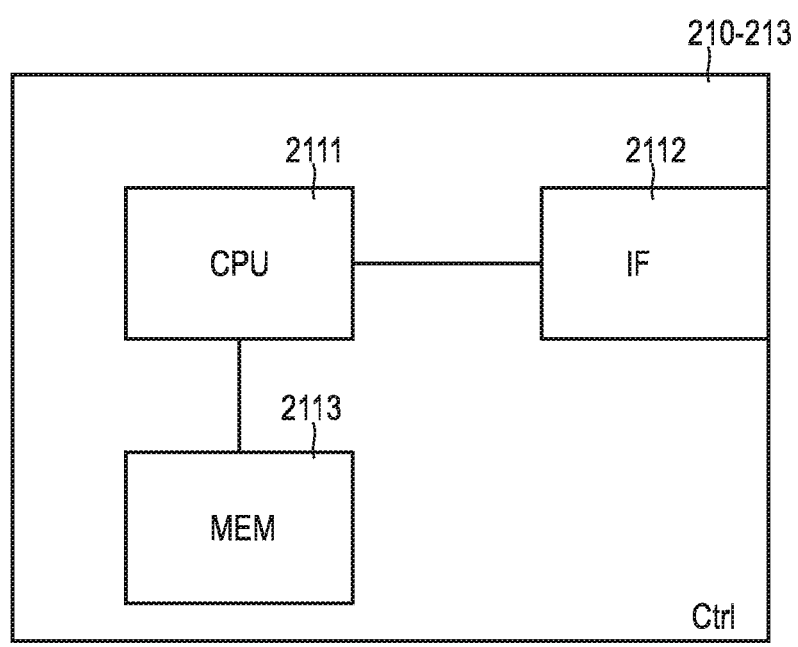
FIG. 6 schematically illustrates a local control node of an EC system according to various examples.

FIG. 6 illustrates aspects in connection with a local control node 210-213. Typically, the respective local control node 210-213 is fixedly associated with a given EC system. The local control node 210-213 includes control circuitry implemented, in FIG. 6, by a processor 2111, an interface 2112, and a memory 2113. Communication with other nodes is possible via the interface 2112. Program code can be stored in the memory 2113 and then be executed by the processor 2111. Executing the program code causes the processor 2111 to perform techniques as described herein, e.g.: managing EC mobility in the respective EC system; registering the EC system with a global control node; etc.

Figure 7:
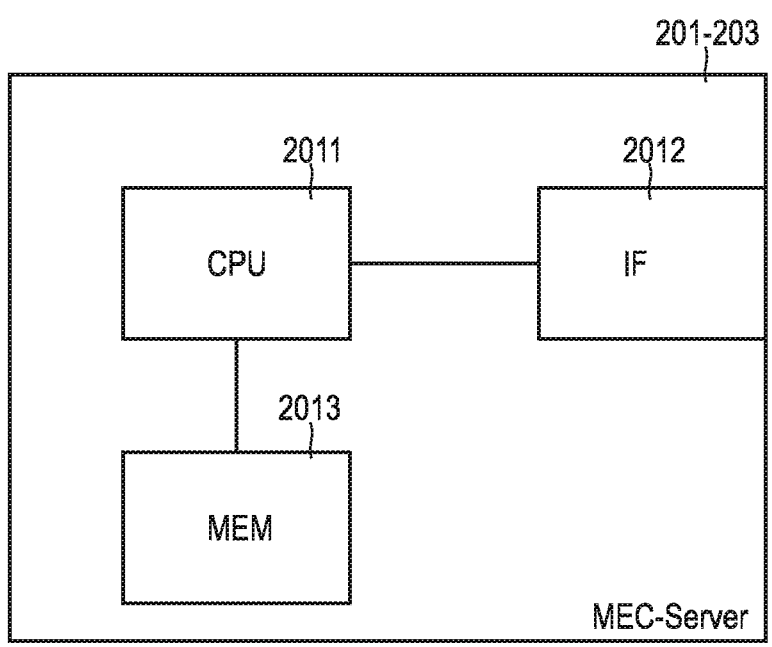
FIG. 7 schematically illustrates in EC server according to various examples.

FIG. 7 illustrates aspects in connection with an EC server 201-203. Typically, the respective EC server 201-203 is fixedly associated with a given EC system. The EC server 201-203 includes control circuitry, implemented, in FIG. 7, by a processor 2011, an interface 2012, and a memory 2013. Communication with other nodes is possible via the interface 2012. Program code can be stored in the memory 2013 and then be executed by the processor 2011.

Executing the program code causes the processor 2011 to perform techniques as described herein, e.g.: executing an EC application; providing context information of the EC application, e.g., in response to receiving a corresponding token; etc.

Figure 8:
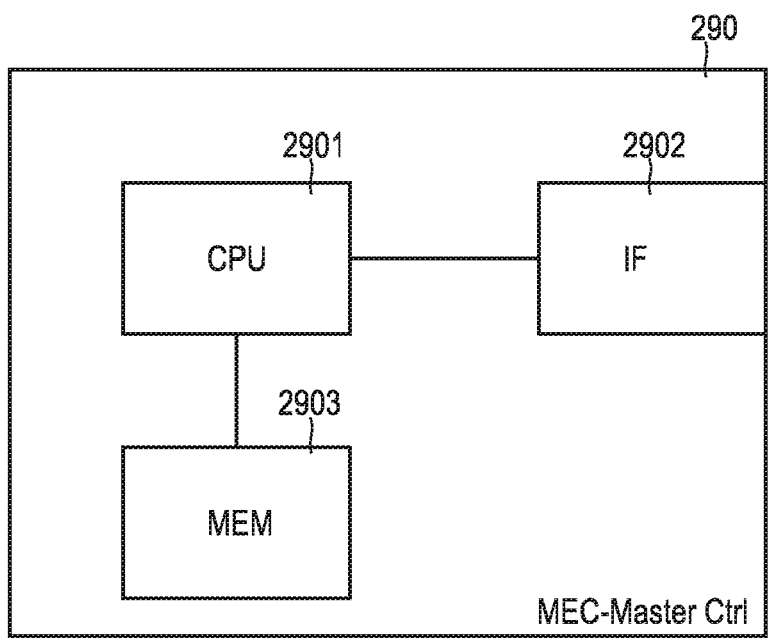
FIG. 8 schematically illustrates the master control node according to various examples.

FIG. 8 illustrates aspects in connection with the master control node 290. Typically, the master controller 290 is not fixedly associated with a given EC system. The master control node 290 includes control circuitry, implemented, in FIG. 8, by a processor 2901, an interface to thousand 902, and a memory 2903. Communication with other nodes is possible via the interface 2902. Program code can be stored in the memory 2902 and then be executed by the processor 2901. Executing the program code causes the processor 2901 to perform techniques as described herein, e.g.: managing inter-EC system mobility; supporting a UE by selecting of the appropriate EC system; relaying context information of an EC application between EC systems; managing exchange of context information of an EC application between EC systems, e.g., based on unique tokens; enforcing policies by selecting the appropriate EC system; etc.

Figure 9:
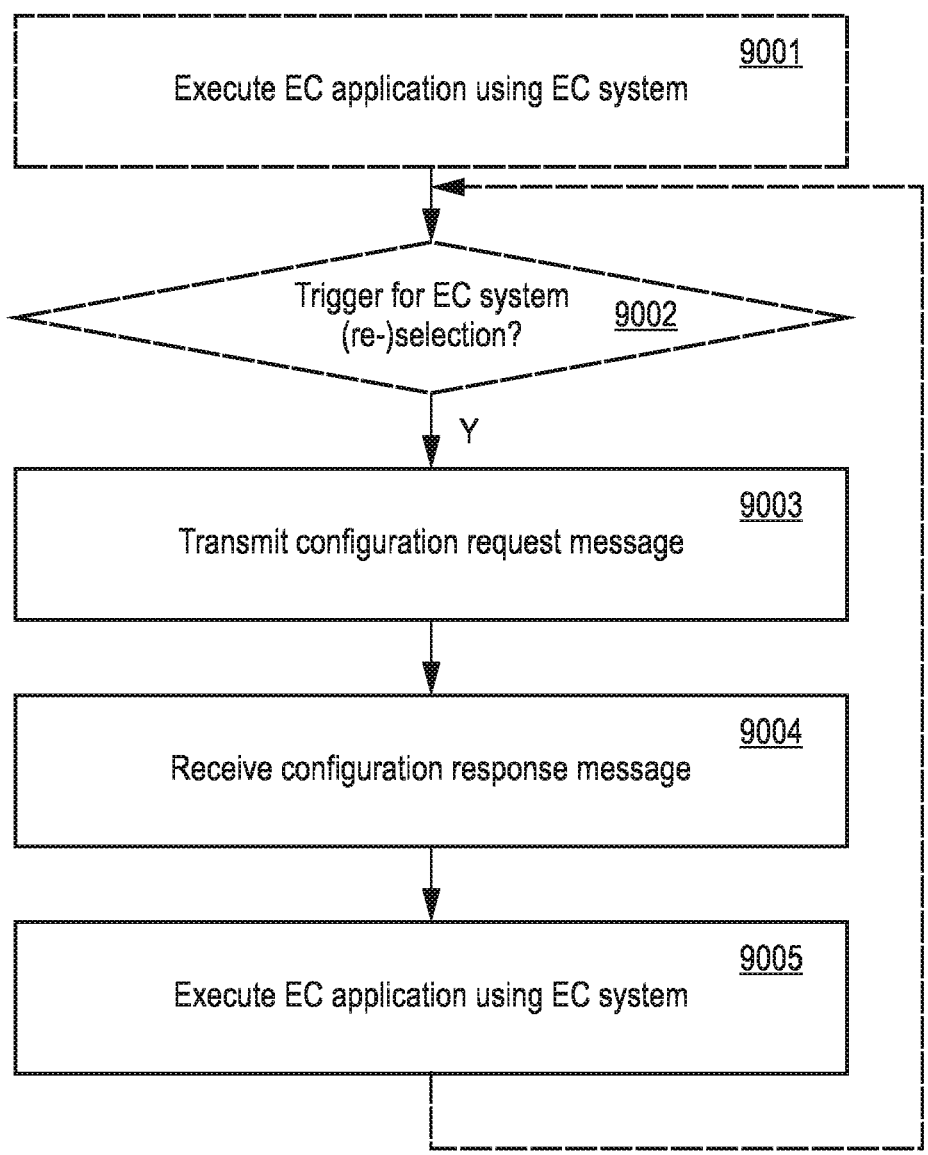
FIG. 9 is a flowchart of a method according to various examples.

FIG. 9 is a flowchart of a method according to various examples. For example, the method according to FIG. 9 may be executed by the UE 130, e.g., by the processor 1301 based on program code retrieved from the memory 1303. Optional blocks are marked with dashed lines.

At optional block 9001, and EC application is executed using a source EC system. The source system is the current system used for executing the EC application—i.e., prior to performing any inter-EC system relocation.

Executing the EC application may involve exchange of control data and user data with an EC server of the source EC system hosting the EC application.

Next, at optional block 9002, it is checked whether one or more trigger criteria for (re-)selection of an EC system are fulfilled. For example, if an EC application is not being executed when implementing block 9002, then a EC system may be selected for commencing execution of the EC application. Commencing executing may include retrieving application executables from a slow memory of the UE and writing the application executables into a fast memory. Thereby, the appropriate EC system can be selected providing the best choice—e.g., in terms of quality of service, etc.—when commencing execution of the EC application.

Differently, if an EC application is executed when implementing block 9002, then, a target EC system may be selected which is different from the source EC system currently used for execution of the EC application. This corresponds to implementing an inter-EC system relocation of the EC application.

As a general rule, various trigger criteria are conceivable in connection with block 9002. Examples include a change of a connectivity status of the UE and/or a change of the location of the UE. For example, a change of the connectivity status may be detected if a new AN becomes available or a previously available AN becomes unavailable or shows a significant change in channel quality. A change of the connectivity status may be detected if a new EC system becomes available or if a previously available EC system becomes unavailable. For example, a change in the location of the UE may be detected if one or more of the CMCC, CMNC, MCC, or MNC change. A change in location may also be detected in accordance with the movement pattern of the UE, e.g., by implementing threshold comparisons between a position of the UE and reference positions. For example, if the UE travels by a certain distance which is larger than a threshold distance, a respective trigger criterion of block 9002 may be fulfilled. Yet a further example of a trigger criterion conceivable in connection with block 9002 includes expiry of a timer or a repetitive timing schedule. Thereby, freshness of the EC selection decision can be facilitated.

Next, at block 9003, a configuration request message is transmitted to a master control node. This configuration request message requests assistance in configuring the EC application.

Specifically, it requests an indication of one or more EC systems that may be suitable in connection with the execution of the EC application. This configuration request message may be indicative of information associated with one or more decision criteria applied by the master control node when selecting the appropriate EC system from a plurality of candidate EC systems, see FIG. 10, block 9024. For example, the control message may be indicative of the connectivity status and/or the location of the UE. The connectivity status may be indicative of the available one or more ANs of networks. Alternatively, or additionally, the connectivity status may be indicative of one or more available EC systems.

Further details of the configuration request message of block 9003 are explained in connection with FIG. 11, configuration request message 7001.

Next, at block 9004, a configuration response message is received from the master control node. The master control node thereby signals one or more prioritized EC systems. It thereby assists in configuration of the execution of the EC application. The configuration response message is the response to the configuration request message.

Further details of the configuration response message of block 9004 are explained in connection with FIG. 11, configuration response message 7002.

If multiple EC systems are indicated by the configuration response message, the UE may select an appropriate EC system from the indicated multiple EC systems.

At block 9005, the UE implements the selection in accordance with the configuration response message. Hence, the UE executes the EC application using a selected one of the one or more prioritized EC systems. Block 9005 may include a setup of the EC application, e.g., including control signaling with the prioritized EC system for connection. See FIG. 11, 8003.

For example, if at block 9001 the EC application is executed using a source EC system then, at block 9005, the EC application can be executed using a different target EC system. This corresponds to implementing an inter-EC system relocation of the EC application.

Figure 10:
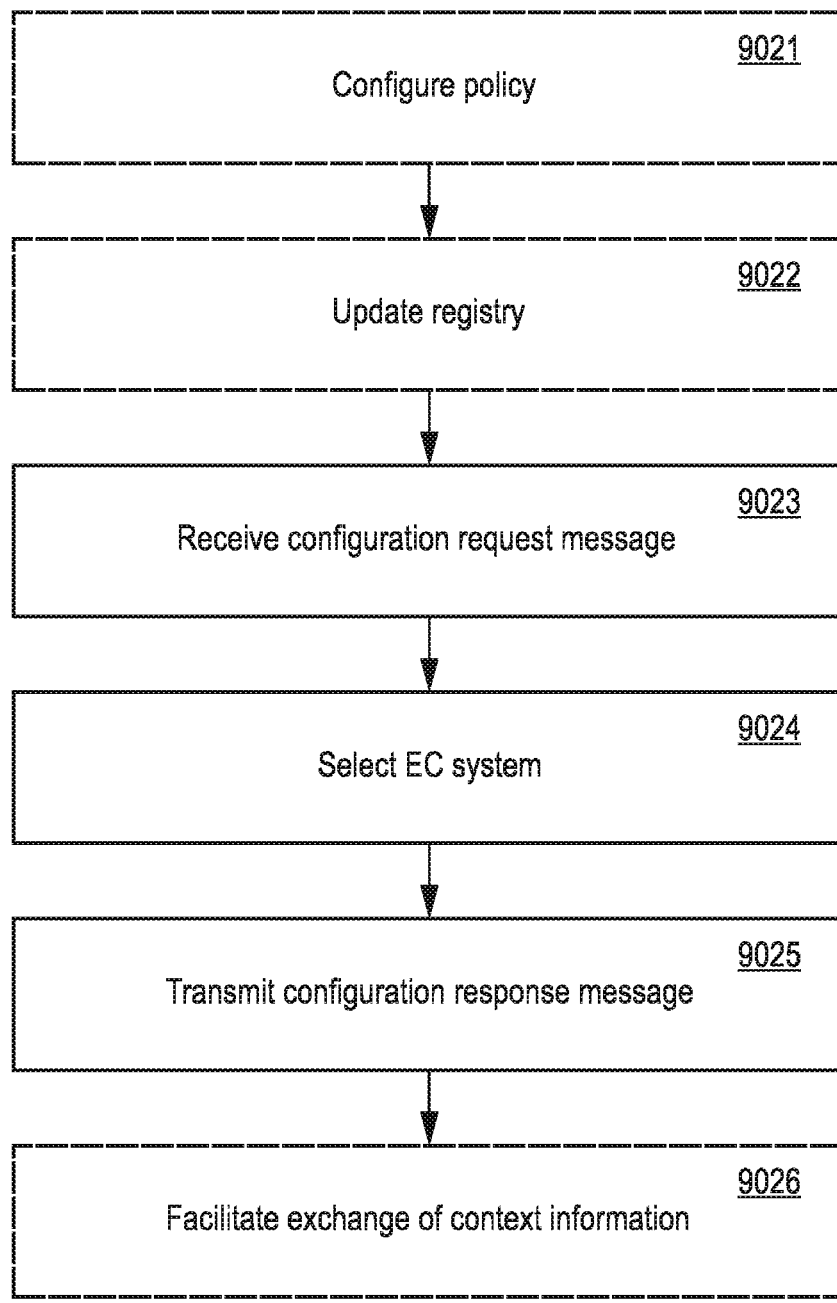
FIG. 10 is a flowchart of a method according to various examples.

FIG. 10 is a flowchart of a method according to various examples. For example, the method according to FIG. 10 may be executed by the master control node 290, e.g., by the processor 2901 based on program code retrieved from the memory 2903. Optional blocks are marked with dashed lines.

In optional block 9021, a policy for selection of EC systems from candidate EC systems is configured. For example, the policy may be configured by an operator of the master control node and/or the candidate EC systems. This corresponds to provisioning the policy for future use at the master control node.

As a general rule, various kinds and types of policies may be used. Specifically, the policy may include one or more rules. An example relates to a security rule. For example, the security rule may indicate which EC systems that the master control node 290 have business agreement with. This allows an UE to trust different EC systems 261-263 and still ensure that the user context is never transferred to an EC System 261-263 that the master control node 290 does not accept.

In a further example, the policy may include an authorization rule. For example, the authorization will may define access rights to EC systems for a plurality of subscribers. For example, the access rights may depend on the particular service identity of the EC application for which access is desired. Thereby, traffic shaping in an EC scenario becomes possible.

Next, in block 9022, a registry of a plurality of candidate EC systems is updated. This may be based on control signaling with the plurality of candidate EC systems. For example, a respective onboarding control message and/or a respective offboarding control message may be received from a given candidate EC system. The control signaling may be indicative of a availability of the candidate EC systems for supporting respective EC applications. Overload or congestion scenarios may be indicated. Thereby, up-to-date traffic shaping becomes possible.

Based on the control signaling, the capability of the plurality of candidate EC systems can be determined and tracked in the registry. To this end, it would be possible that the control signaling includes one or more supported connectivity statuses of UEs using the respective EC system. For example, it would be possible to signal the supported ANs associated with the respective EC system (cf. FIG. 2). The control signaling may include one or more EC applications supported by the respective EC system. Thereby, the requirement specification of the UE can be matched with the various entries in the registry and the most suitable EC system can be selected.

Next, at block 9023, a configuration request message is received from a UE. The configuration request message may, generally, include information corresponding with the information required to apply one or more rules of the pre-configured policy of block 9021 and/or corresponding with the information tracked in the registry of block 9022. As a general rule, the configuration request message may be indicative of the connectivity status of the UE and/or a location of the UE. Such information may be required to determine which candidate EC systems are, in principle, selectable by the UE and which EC systems are out of coverage of the UE.

Block 9023 is inter-related with block 9003 of FIG. 9.

At block 9024, one or more EC systems are selected from the plurality of candidate EC systems. The selection is based on the received configuration request message of block 9023.

As such, the selection may be specifically based on the connectivity status of the UE and/or the location of the UE. Alternatively, or additionally, other information included in the configuration request message may be taken into account when selecting the EC system at block 9024. For example, further information that may be taken into account when selecting the EC system at block 9024 includes: a service identity of the EC application for which an appropriate EC system is to be selected; and/or one or more ANs available to the UE.

Beyond such information included in the configuration request message, alternatively or additionally, other decision criteria may be taken into account when selecting the EC system at block 9024. Example decision criteria include the pre-configured policy of block 9021 (claim 11). For example, security levels and/or access rights requested by the UE can be matched with the security levels and/or access rights supported by the various candidate EC systems.

Next, the result of the selection is signaled to the requesting UE. At block 9025, a configuration response message is transmitted to the UE. The configuration response message is indicative of the selected one or more EC systems, e.g., by a respective address of the proxy node of the selected EC system.

Block 9025 is inter-related with block 9004 of FIG. 9.

In some scenarios, the selection of the EC system at block 9024 may result in an inter-EC system relocation of the EC application. In such a scenario, at optional block 9026, the master control node may facilitate exchange of the context information of the EC application between the respective source EC system and the respective target EC system.

As a general rule, different implementations of block 9026 are conceivable. In one scenario, the master control node may receive the context information, e.g., from the UE or the source EC system. For example, the master control node may receive the context information from an EC server of the source EC system. Then, the master control mode may transmit the context information to the target EC system, e.g., to a EC server of the target EC system hosting the EC application. A local control node of the target EC system may provide information on which particular EC server of the target EC system will be used for executing the EC application at the target EC system. The context information may also be provided to the local control node of the target EC system. In such an implementation, the master control node acts as a relay for the context information. In another implementation, the master control not may not relay the context information, but rather facilitate peer-to-peer exchange of the context information from the source EC system to the target EC system. This may be based on a token uniquely identifying the context information or granting access to the context information. The master control node may receive the token, e.g., from the UE or the source EC system. For example, the master control node may receive the token from the local control node of the source EC system or may receive the token from an EC server of the source EC system currently executing the EC application. Then, the master control node may transmit the token to the target EC system. For example, the master control node may transmit the token to an EC server of the target EC system that will be used to host the EC application in response to implementing the inter-EC system relocation. For example, the master control mode may transmit the token to the local control node of the target EC system. Based on the token, the target EC system may then retrieve the context information directly from the source EC system.

Such facilitating of the migration of the context information helps to achieve low-latency inter-EC system relocation of the EC application.

Figure 11:
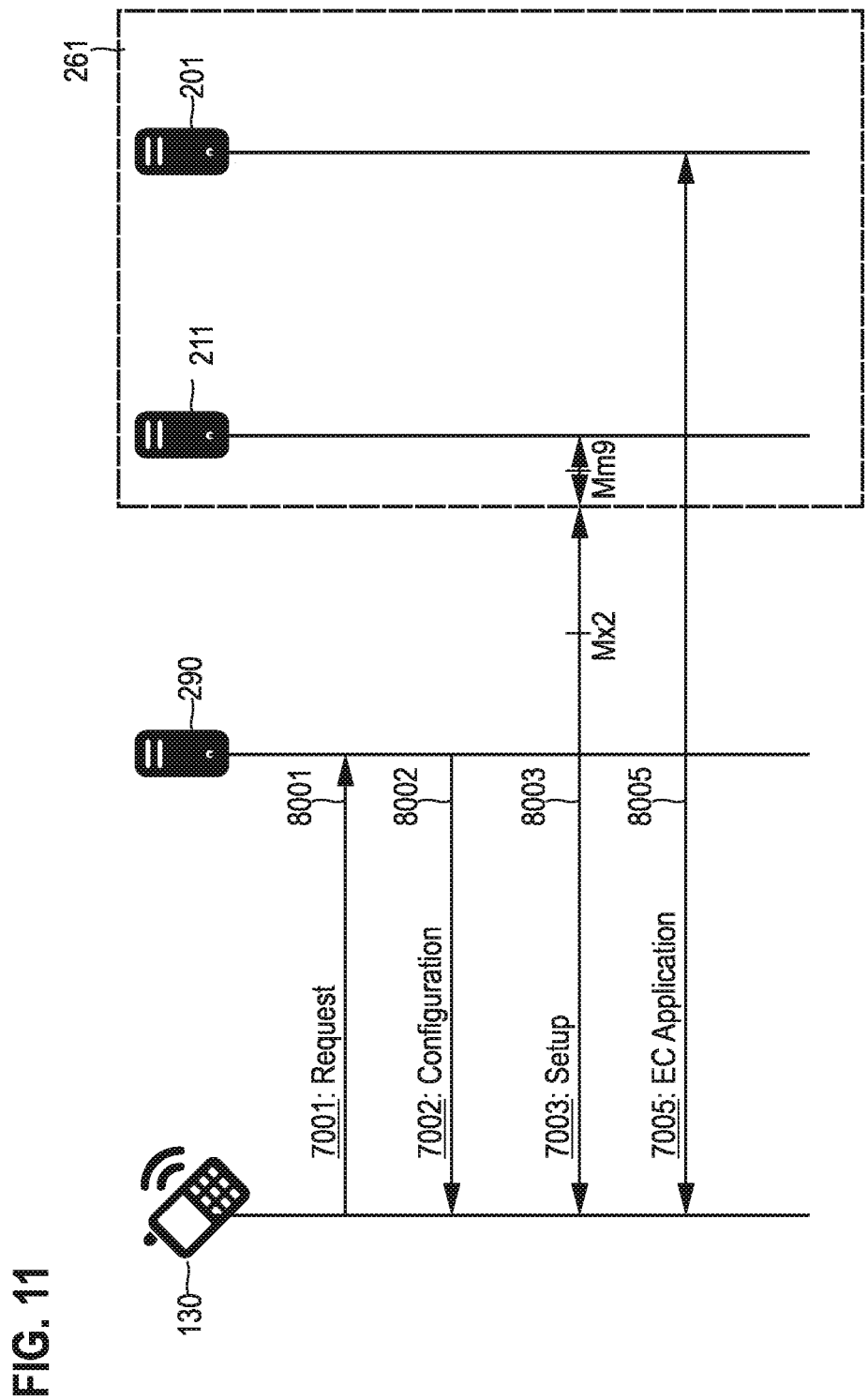
FIG. 11 is a signaling diagram of control signaling associated with the selection of an EC system according to various examples.

FIG. 11 is a signaling diagram illustrating aspects with respect to selection of an EC system 261.

At 8001, the UE 130 transmits a configuration request message 7001 which is then received by the master control node 290. See blocks 9003 and 9023. This configuration request message requests assistance in configuring the EC application. Specifically, it requests an indication of one or more EC systems that may be suitable in connection with the execution of the EC application.

The configuration request message 7001 may include the service code of the EC application.

The configuration request message 7001 may include MCC, MNC, cellID and SSID of the respective network 100.

The master controller 290 then selects one or more suitable EC system, here EC system 261, from a plurality of candidate EC systems. The master controller 290, at 8002, transmits a configuration response message 7002 which is indicative of the selected EC system(s). See blocks 9025 and 9004.

For example, the selected EC system may be indicated by signaling an address or identity of the respective proxy node, e.g., the Usr app LCM procy in case of a MEC scenario.

The UE 130 then—e.g., using the Mx2 reference point in a MEC scenario—communicates with the EC system 261 and performs a setup procedure 7003, at 8003. For this, a proxy node uniquely associated with the respective EC system 261 can be contacted. For example, an address of the proxy node may be included in the configuration response message 7002; or may be stored in the memory 1303 of the UE 130. The setup procedure 7003 may also involve the local control node 211 of the EC system 261—for example, control signaling from the UE 130 via the Mx2 reference point may be provided to the local control node 211 via the Mm9 reference point in a MEC scenario.

Next, at 8005, user data 7005 of the MEC application is communicated between the EC server 201—sometimes also referred to as host server—and the UE 130. This may be based on an address of the EC server 201 provided to the UE 130 and the setup procedure 7003. Hence, the UE 130 executes the MEC application using the EC system 261.

Figure 12:
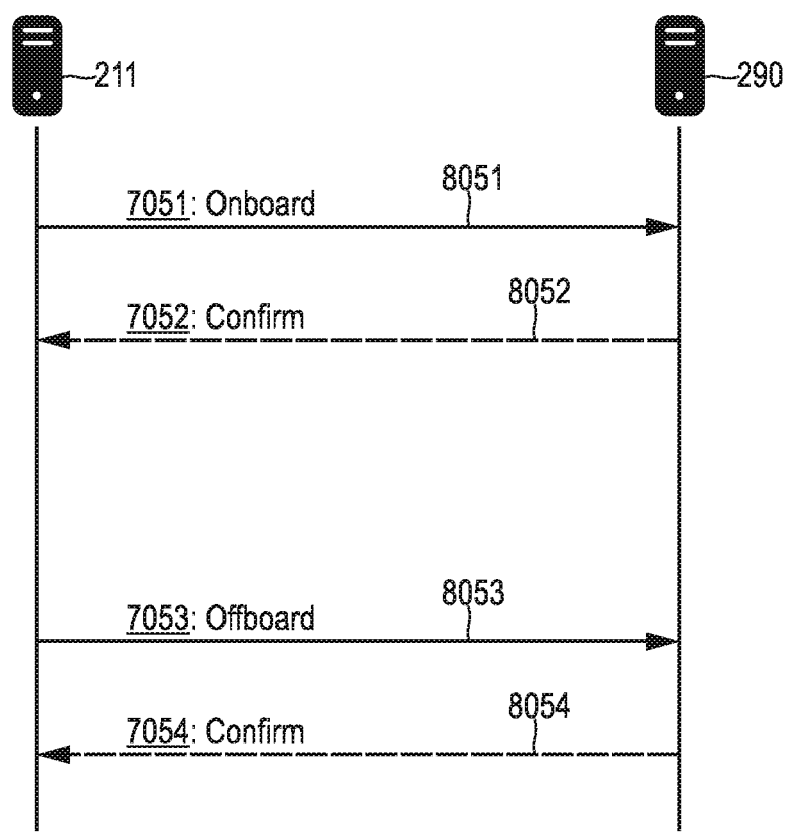
FIG. 12 is a signaling diagram of control signaling associated with updating a registry of multiple EC systems according to various examples.

FIG. 12 is a signaling diagram illustrating aspects with respect to control signaling for updating a registry at the master control node 290. For example, one or more of the signaling blocks 8051-8054 may be executed as part of block 9022.

At 8051, the local control node 211 of the EC system 261 5 transmits an onboarding control message 7051 to the master control node 290. Here, it would be possible to indicate one or more supported connectivity statuses of the EC system 261; and/or one or more ANs associated with the EC system 261; and/or one or more EC application supported by the EC system 261, e.g., by means of the respective service identity. For example, the onboarding control message may include the service identity of the EC application(s) supported by the respective EC system 261; an identity of the local control node 211; MCC, MNC, CMCC, CMNC; an IP address range; SSID or identities of cells used by a respective cellular network.

A trigger criterion for 8051 may be a change in the installation status of an associated EC application, e.g., identified by an EC application service code included in 7051.

The master control node 290 then updates in entry of the registry associated with the EC system 261 accordingly and, at 8052, transmits an onboarding confirmation message 7052 (generally optional). This may include the identity of the local control node 211, i.e., the orchestratorID.

At 8053, the local control node 211 of the EC system 261 transmits an offboarding control message 7053 to the master control node 290. Here, it would be possible to indicate that the EC system 261 does not provide any support for EC applications any more or only provides limited support of EC applications. This may be due to, e.g., congestion or overload of another reason. A respective cause value may be included.

The master controller 290 then updates the respective entry of the registry associated with the EC system 261 accordingly and, at 8054, transmits an offboarding confirmation message 7054 (generally optional).

Messages 7053 and 7054 may include the orchestratorID.

Figure 13:
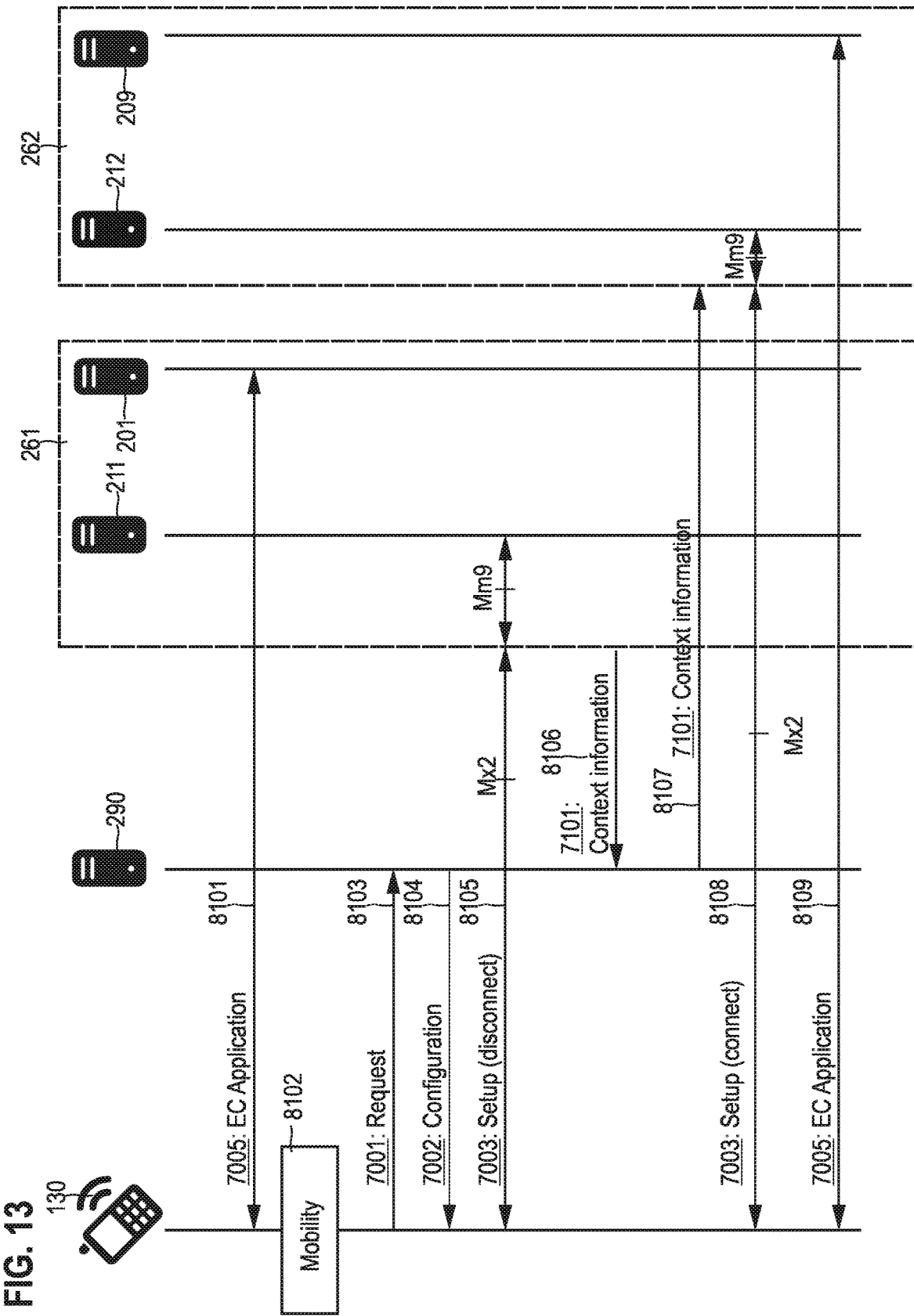
FIG. 13 is a signaling diagram of an inter-EC system relocation of an EC application according to various examples.

FIG. 13 is a signaling diagram illustrating aspects with respect to an inter-EC system relocation of an MEC application.

Initially, the UE 130 executes the EC application using the EC system 261. Hence, at 8101, user data 7005 of the EC application is exchanged with the hosting EC server 201 of the EC system 261.

At 8102, mobility of the UE 130 occurs. Hence, the connectivity status and the location of the UE 130 changes. This is indicated in the configuration request message 7001 communicated at 8103 from the UE 130 to the master control node 290.

The EC server 290 then selects the EC system 262. This corresponds to an inter-EC system relocation from the EC system 261 as the source—to the EC system 262 as the target. At 8104, the master controller 290 transmits the configuration response message 7002 to the UE 130, the configuration response message 7002 being indicative of the EC system 262.

Then, at 8105, the setup process 7003 for the inter-EC system relocation is implemented by the UE 130 and the EC system 261. This involves a disconnect or release associated with the EC application.

At 8106, the EC system 261—e.g., the local control node 211 or the EC server 201—provides the up-to-date context information 7101 to the master control node 290. The master control node 290 then provides the context information 7101, at 8107, to the EC system 262. For example, the master control node 290 may provide the context information 7101 to the EC server 209 or the local control node 212.

Then, at 8108, the setup process 7003 for the inter-EC system relocation is implemented by the UE 130 and the EC system 262. This involves a connect or establishment associated with the EC application. The EC system 262 has the context information 7101 available and, thus, can accept the connect or establishment.

Finally, at 8109, the user data 7005 of the EC application is communicated between the UE 130 and the new hosting EC server 209, taking into account the context information 7101 already provided at 8107.

In the scenario of FIG. 13, the context information 7101 can be migrated from the EC system 261 to the EC system 262—even though it is not required that the EC system 261 and the EC system 262 have a trusted relationship with each other. Specifically, the inter-operability between the EC systems 261, 262 is mediated by the central control node 290.

Figure 14:
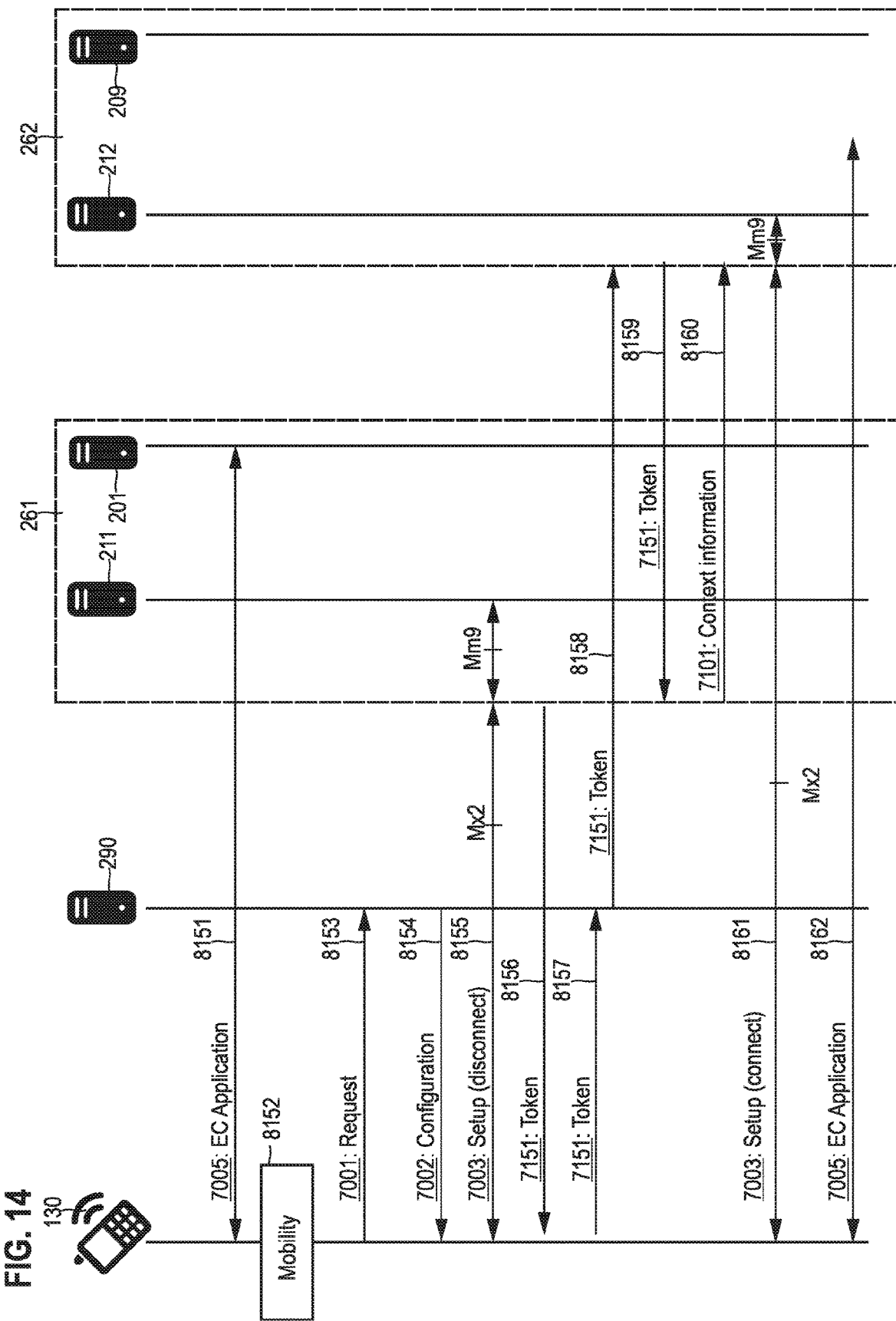
FIG. 14 is a signaling diagram of an inter-EC system relocation of an EC application according to various examples.

FIG. 14 is a signaling diagram illustrating aspects with respect to an inter-EC system relocation of an MEC application. The scenario of FIG. 14 generally corresponds to the scenario FIG. 13.

In FIG. 14, however, the master controller 290, does not relay the context information 7101; but rather facilitates exchange of the context information 7101 by using a respective token 7151. The context information 7101 is exchanged peer-to-peer between the EC systems 261, 262.

8151 corresponds to 8101. 8152 corresponds to 8102. 8153 corresponds to 8103. 5154 correspond to 8104. 8155 corresponds to 8105.

At 8156, the EC system 261—e.g., the local control node 211 or the EC server 211—provides the token 7151 to the UE 130. This is optional and may not be required if the token 7151 is created by the UE 130.

The UE 130 the transmits the token 7151, at 8157, to the master control node 290 or directly to the target EC system 262. Instead of receiving the token 7151 from the UE 130, the master control node 290 may also receive the token 7151 from the EC system 261—e.g., the local control node 211 or the EC server 211.

The master control node 290, at 8158, transmits the token 7151 to the EC system 262—e.g., to the local control node 212 or to the EC server 209.

The EC system 262, at 8159, transmits the token 7151 to the EC system 261—e.g., to the local control node 211 or to the EC server 201.

Then, at 8160, the EC system 261—e.g., the local control node 211 or the EC server 201-transmits the context information 7101 to the EC system 262—e.g., to the local control node 212 or to the EC server 209. 8161 corresponds to 8108. 8162 corresponds to 8109.

In the scenario of FIG. 14, the context information 7101 can be migrated from the EC system 261 to the EC system 262—even though it is not required that the EC system 261 and the EC system 262 have a trusted relationship with each other. Specifically, the inter-operability between the EC systems 261, 262 is mediated by the central control node 290. In the scenario of FIG. 14, the master control node 290 is relieved of the task of forwarding the potentially large context information 7101. Thus, control plane—user plane separation is enforced.

Figure 15:
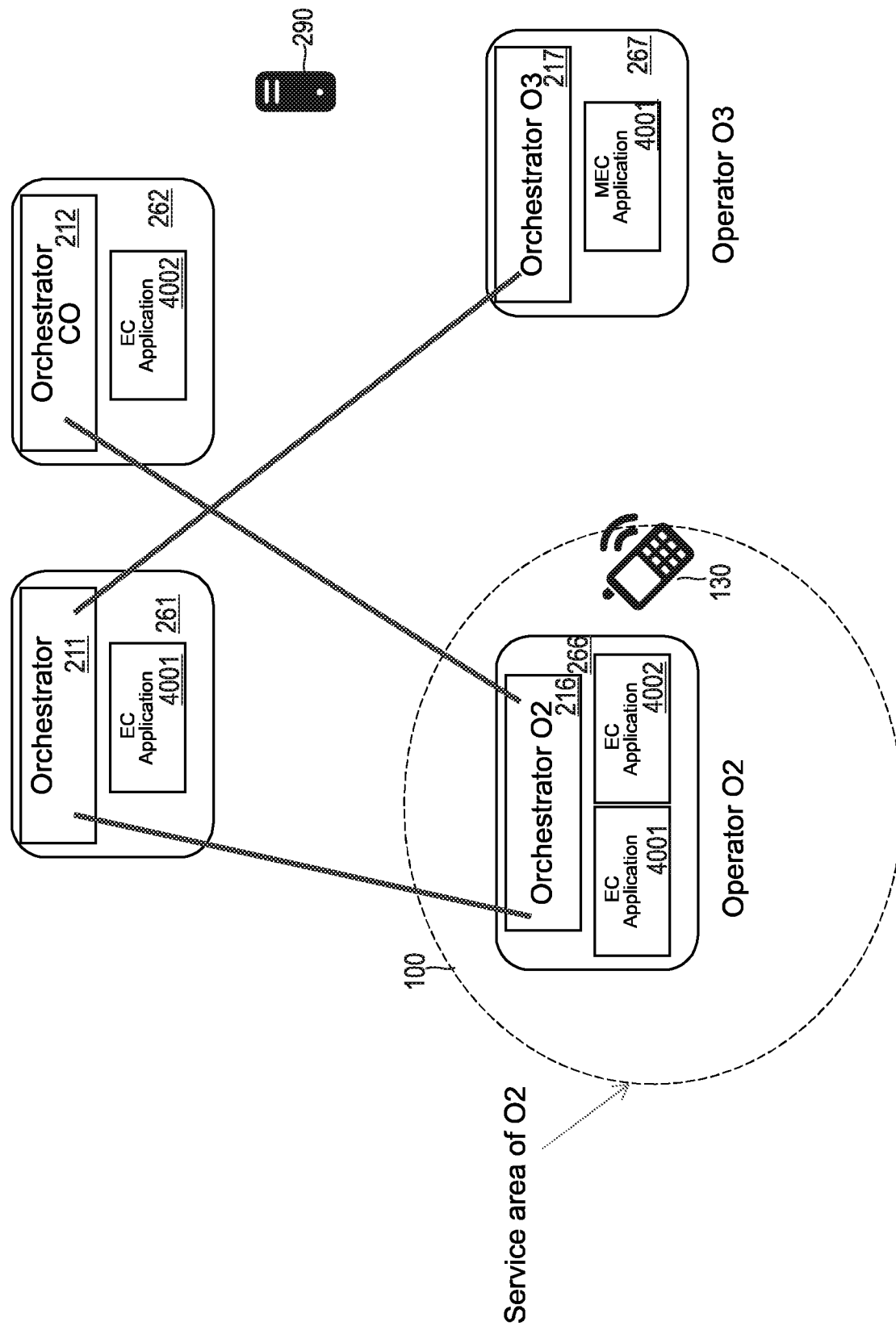
FIG. 15 schematically illustrates a deployment scenario of multiple EC systems according to various examples.

FIG. 15 illustrates aspects with respect to an example deployment scenario of multiple EC systems 261, 262.

Vendor B deploys EC system 261 for executing EC application 4001 and using the local control node 211 (labeled "orchestrator" in FIG. 15). Vendor C deploys EC system 262 for executing EC application 4002 and using the local control node 212. In FIG. 15, the respective EC servers are not shown for sake of simplicity.

EC application 4001 trusts local control node 211. EC application 4002 trusts local control node 212.

Operator O2 operates the network 100. Operator O2 has a business agreement with vendors B and C to use the EC systems 261, 262 for the EC applications 4001 and 4002, respectively.

Operator O3 only has a business agreement with vendor B to use EC system 261 for EC application 4001.

Operator O2 also operates an EC system 266 for the EC applications 4001 and 4002. Operator O3 operates the EC system 267 for the EC application 4001.

In such a scenario, the local control node 216 of the EC system 266 can register with the master control node 290 using an on-board configuration message 7051. Likewise, the local control node 217 of the EC system 267 can register with the master controller 290 using an on-board configuration message 7051. These on-board configuration messages can specify the connectivity statuses (CMCC, CMNC, etc.) as required by the UE 132 used the respective EC system 266, 267.

A user then installs the EC application 4002. Commencing of the execution of the EC application 4002 triggers transmitting a configuration request message 7001 to the master control node 290. The configuration request message 7001 includes the connectivity status of the UE 130, i.e., CMCC and CMNC of the network 100. The master control node 290 then selects the appropriate EC system from candidate EC systems 262, 266 which support the EC application CA. For example, if the UE 130 is located in the service area of the network 100 hen, the EC network 266 can be used; otherwise, the EC network 262 may be used.

Figure 16:
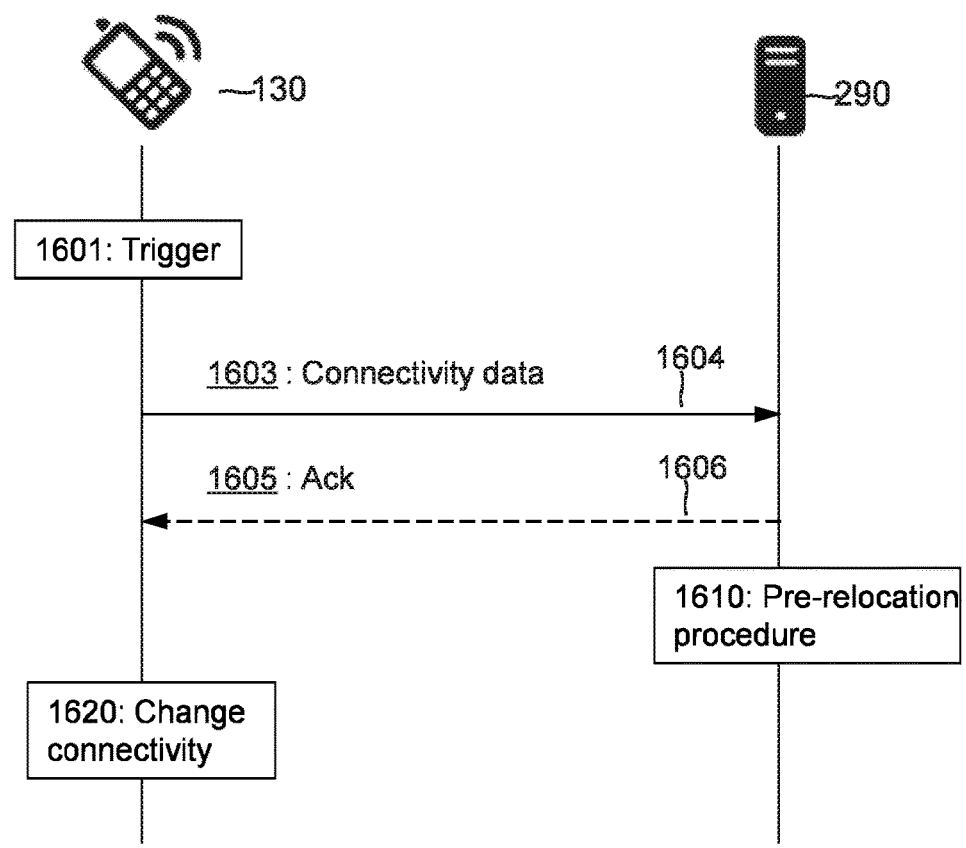
FIG. 16 is a signaling diagram associated with pre-relocation during an inter-EC system relocation of an EC application according to various examples.
Figure 17:
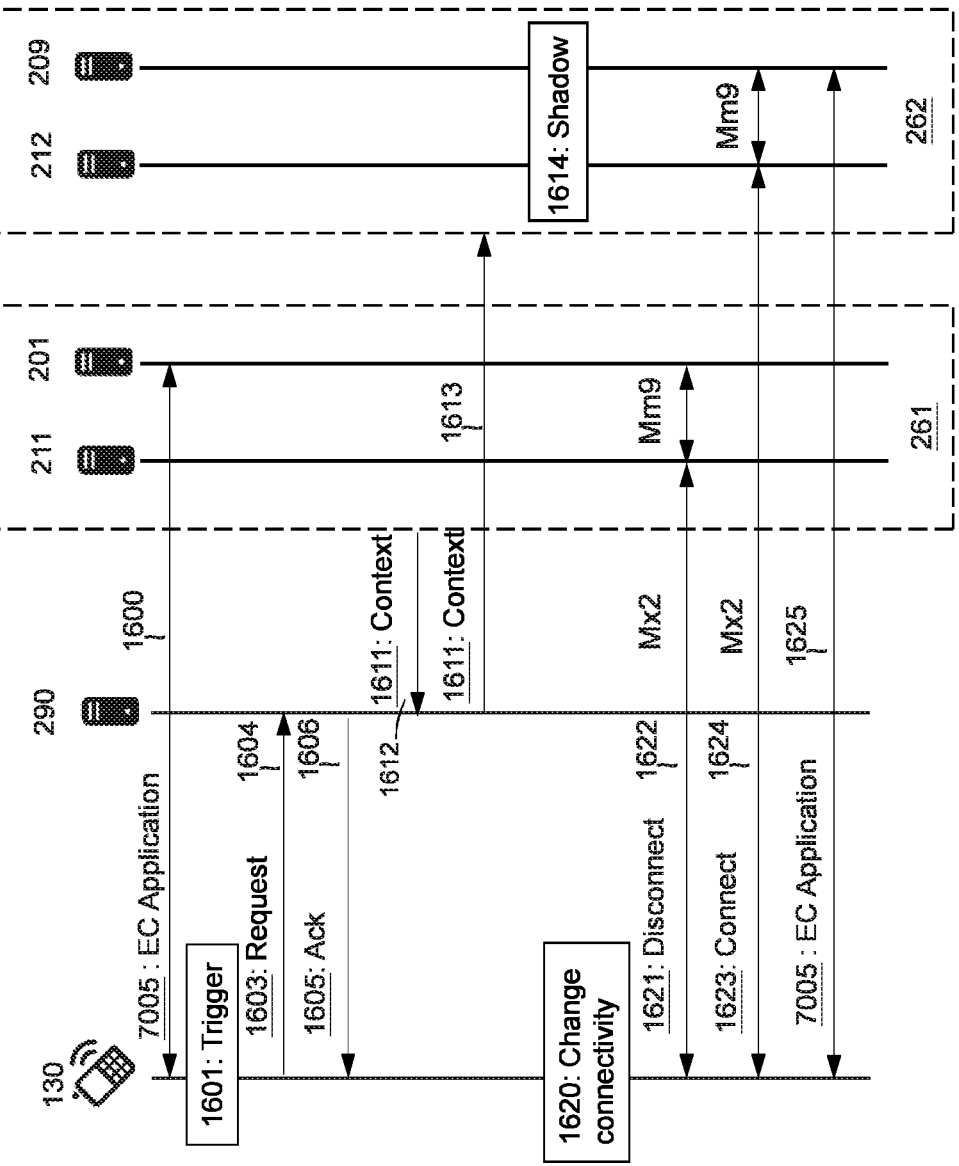
FIG. 17 is a signaling diagram associated with pre-relocation during an inter-EC system relocation of an EC application according to various examples, illustrating different EC systems.
Figure 18:
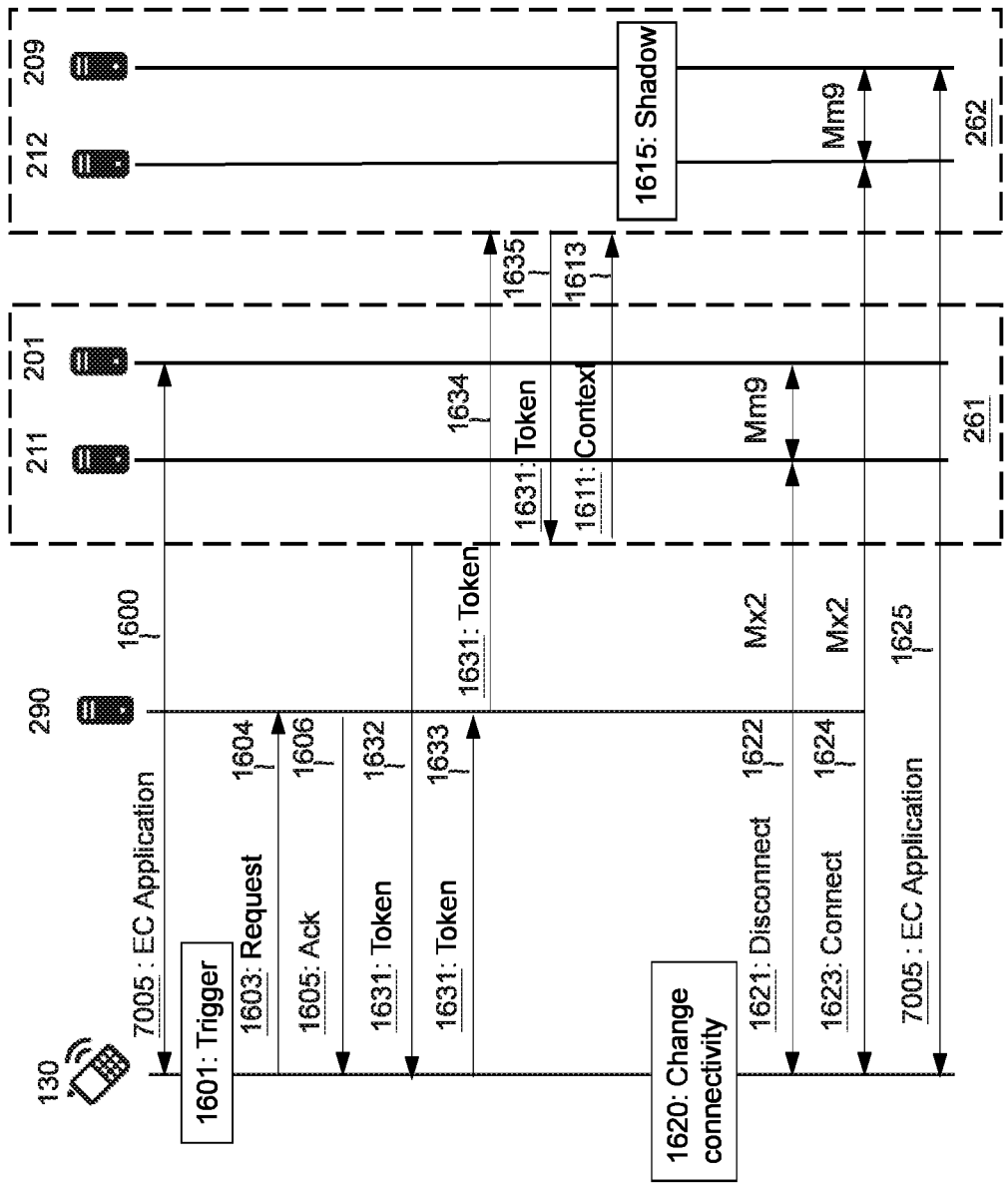
FIG. 18 is a signaling diagram associated with pre-relocation during an inter-EC system relocation of an EC application according to various examples, illustrating different EC systems and using a token.

FIGS. 16-18 disclose signaling diagrams illustrating aspects with respect to methods of operating inter alia a terminal 130 and a master control node 290 of an edge computing architecture according to various embodiments.

In various cases, these embodiments may employ the notion of the EC application reporting which connectivity that is possible to use to access the EC application to the master control node 290, in various embodiments referred to as a main orchestrator 290. This reporting may for example include that the EC application is supporting a specific PLMN or a list of SSID's or a geographical area. This reporting may for example be done by the EC application at instantiation or startup.

In some embodiments it is proposed that before a new connectivity is expected to be used, the terminal 130 shall request the EC System(s) to evaluate whether the terminal 130 should be served by a different EC System than the current one. This is broadly illustrated in FIG. 16. This is an optimization compared to a scenario of evaluating whether the terminal 130 should be served by a different EC System after the terminal 130 has already changed its connectivity. By starting the discovery procedure, policy evaluation, security procedures etc. prior the connectivity change, the latency can be improved. This is especially important when different access technologies are involved, e.g. between wi-fi and cellular access, meaning that connectivity changes from one access network type to another access network type. This will also make a significant difference if the EC application has a user context that needs to be relocated before a new EC System is able to service the terminal 130. This will allow the possibility of preparing a shadow instance of the application, based on the user context, in a target EC system for fast relocation and switching when the connectivity changes for the terminal 130. In this context, a shadow instance of the application may refer to carrying out an instantiation of the application in the target EC system, a user instance, based on obtained user context. This may be carried out with no or substantially no traffic being routed to the application in the target MEC system until the application is ready to receive traffic and an underlying data plane is configured to route the traffic towards it, e.g. after a change of connectivity to gain access to the target EC system.

With reference to FIG. 16, the terminal 130 may in a step 1604 be configured to transmit a configuration request message 1603 indicative of a predicted future connectivity status of the terminal 130, wherein the predicted future connectivity status is indicative of at least one of an access network to become in range of the terminal and a predicted future location of the terminal 130. The configuration request message 1603 may thus carry connectivity-related data indicative of at least one of a predicted future connectivity status of the terminal 130 and a predicted future location of the terminal (130), such as MCC, MNC, cellID and SSID of a respective network 100.

Transmission of the configuration request message 1603 indicative of a predicted future connectivity status may be triggered in a step 1601. The trigger 1601 to identify that a new or different network access type is predicted to become available or in range may be implementation specific. Furthermore, methods for providing the request message 1603, and the data conveyed, may be carried out as in any of the previously outlined embodiments. For example, the connectivity data may include IP address, an SSID, a location or last use IP address for that location.

The trigger in step 1601 may involve that the terminal 130 detects that the current network connectivity most likely will change. This may be based on e.g. mobility of the terminal detected by change of GPS location using a GPS signal receiver. The detected mobility may be mapped to a location map of access networks know to the terminal 130 or to a system accessible by the terminal 130. The detected mobility may be analyzed and determined to indicate movement in direction to a location where an access network, e.g. a WiFi Network (SSID), has been detected in the past. In various embodiments, the trigger may be that signaling strength of a target access network starts to be available, or that signaling strength of a current access network is weakening. In another embodiment, the trigger may include a point in time, e.g. in combination with a detected location. In various embodiments, the point in time and location may indicate a predicted route and/or target location. As an example, a determined location at a road or a public transportation station, in combination with a range of time associated with an habitual travel to e.g. work, may be a trigger that a predicted destination, and/or points along the travel, will be reached at a certain time. The trigger step 1601 may thus include comparing present location, and possible also time, with a learned and a stored habitual or recognized predicted location and time of reaching that location. Knowledge of access networks from data that may be stored from previous presence in the predicted location, may be used to compile connectivity data or a request message 1603 containing such connectivity data. In an alternative embodiment, only the position data may be transmitted in the request message, and the mapping to a predicted location and time may be carried out in another node, e.g. in a present access network or in the master control node 290. In these embodiments, the trigger 1601 is thus based on a predicted future connectivity, and not on disconnection of a current access network or a connection to a target access network.

When the master control node 290 receives the request message 1604, it may answer with an acknowledgment message 1606. In a step 1610, the master control node 290 may carry out a pre-relocation procedure 1610. This may include setting up a shadow instance of an EC application in a target EC system, based on context information associated with an EC application. In a subsequent step 1620, the terminal 130 changes connectivity to an access network indicated by or in the connectivity data of the request message 1604. This will as such trigger actual relocation of hosting of the application, such as an inter-edge system relocation.

With this solution compared to existing mechanism is that the terminal 130 takes on an active role since only the terminal 130 may have knowledge in advance of the expected new connectivity, and hence provides this information to the system 290 when possible. Furthermore, this solution is applicable for example in the following cases:

Optimized relocation time of user context when the terminal 130 change connectivity Optimized policy decision and intersystem mobility, since such policy decisions may be checked before the relocation is even initiated Possibility to prepare new application instances in advance.

FIG. 17 is a signaling diagram illustrating aspects with respect to an inter-EC system relocation of a MEC application, according to an embodiment.

Initially, the UE 130 executes the EC application using the EC system 261. Hence, at 1600, corresponding to 8101 of FIG. 13, user data 7005 of the EC application is exchanged with the hosting EC server 201 of the EC system 261.

At 1601, a trigger occurs. As outlined, the trigger may be mobility of the UE 130, or e.g. that the position of the terminal 130 is determined to match with a predetermined location, such as a location area or geo fence. In various embodiments, a level of mobility, such as speed and/or velocity, and/or a certain determined position, may be combined with a point or range in time, to constitute the trigger 1601. When the trigger 1601 occurs, the connectivity status and the location of the UE 130 may change or may be determined to become changed. This is indicated in the configuration request message 1603, corresponding to 7001 of FIG. 13, communicated at 1604 from the terminal 130 to the master control node 290.

The master control node 290 may respond with an acknowledgement 1605 in step 1606. Based on data received in the request message 1603, the master control node 290 may then select one or more appropriate the EC system 262 for future re-location. In various embodiments, the request message 1603 may explicitly indicate a future position and time, or even an access network to become in range, or implicitly such that the master control node 290 may obtain this information based on the data received in the request message 1603. This future re-location to be prepared corresponds to an inter-EC system relocation from the EC system 261 as the source—to the EC system 262 as the target. At 1606, the master control node 290 may transmit the acknowledgment 1605 as a configuration response message, corresponding to 7002, to the UE 130, the configuration response message being indicative of the EC system 262.

A pre-relocation procedure 1610 is then carried out under control of the master control node 290, including at least steps 1612-1614. This is carried out prior to disconnect of the terminal 130 from the current EC system 261.

At 1612, corresponding to 8106, the EC system 261—e.g., the local control node 211 or the EC server 201-provides up-to-date context information 1611 to the master control node 290. The master control node 290 then provides the context information 1611, at 1613, to the EC system 262. For example, the master control node 290 may provide the context information 1611 to the EC server 209 or the local control node 212. While only one instance of communicating context information, in steps 1612 and 1613, is shown, this may include repeated steps. The time passing between the trigger 1601 and actual change of connectivity 1620 of the terminal 130 may be extended, and context information 1611 may therefore change in the meantime.

At step 1614, a shadow instance of the running application 7005 is prepared in target EC system including a user instance containing the user context, based on the received context information 1611. This way, the target EC system 262 is prepared to take over as host for the application 7005 for the terminal 130. The setup process 1610 for the inter-EC system relocation is thereby prepared. Other alternatives for transferring the user context between the EC systems 261 and 262 could be direct from source EC system 261 to target EC system 262. This may be done via target EC system 262 requesting the user context from the source EC system 261, or the opposite, i.e. the source EC system 261 pushing the user context to the target EC system 262.

At a step 1620, a connectivity change for the terminal 130 occurs. This may be triggered by the terminal entering an area of acceptable QoS with an access system indicated in the request message 1603.

Then, at 1622, a disconnect or release 1621 associated with the EC application 7005 is carried out, implemented by the terminal 130 and the EC system 261.

Then, at 1624, a connect or establishment 1623 associated with the EC application 7005 is implemented by the terminal 130 and the EC system 262. The target EC system 262 has the context information 1611 available and, thus, can immediately take over as host, with minimum latency.

Finally, at 1625, the user data 7005 of the EC application is communicated between the terminal 130 and the new hosting EC server 209, taking into account the context information 1611 already provided at 1613.

In the scenario of FIG. 17, the context information 1611, as for 7101 in the embodiment of FIG. 13, can be migrated from the EC system 261 to the EC system 262—even though it is not required that the EC system 261 and the EC system 262 have a trusted relationship with each other. Specifically, the inter-operability between the EC systems 261, 262 is mediated by the central control node 290.

FIG. 18 is a signaling diagram illustrating aspects with respect to an inter-EC system relocation of an MEC application. The scenario of FIG. 18 generally corresponds to the scenario FIGS. 14 and 17.

In FIG. 18, however, the master controller 290, does not relay the context information 1611; but rather facilitates exchange of the context information 1611 by using a respective token 1631. The context information 1611 is exchanged peer-to-peer between the EC systems 261, 262.

At 1632, the EC system 261—e.g., the local control node 211 or the EC server 211—provides the token 1631 to the terminal 130. This is optional and may not be required if the token 1631 is created by the terminal 130.

The terminal 130 the transmits the token 1631, at 1633, to the master control node 290. Instead of receiving the token 1631 from the terminal 130, the master control node 290 may also receive the token 1631 from the EC system 261—e.g., the local control node 211 or the EC server 211.

The master control node 290, at 1634, transmits the token 1631 to the EC system 262—e.g., to the local control node 212 or to the EC server 209.

The EC system 262, at 1635, transmits the token 1631 to the EC system 261—e.g., to the local control node 211 or to the EC server 201.

Then, at 1613, the EC system 261—e.g., the local control node 211 or the EC server 201—transmits the context information 1611 to the EC system 262—e.g., to the local control node 212 or to the EC server 209.

At step 1615, a shadow instance of the running application 7005 is prepared in target EC system including a user instance containing the user context, based on the received context information 1611. This way, the target EC system 262 is prepared to take over as host for the application 7005 for the terminal 130. The setup process 1610 for the inter-EC system relocation is thereby prepared. Other alternatives for transferring the user context between the EC systems 261 and 262 identified by the token could be direct from source EC system 261 to target EC system 262. This may be done via target EC system 262 requesting the user context from the source EC system 261 or the opposite, the source EC system 261 is pushing the user context to the target EC system 262.

At a step 1620, a connectivity change for the terminal 130 occurs. This may be triggered by the terminal entering an area of acceptable QoS with an access system indicated in the request message 1603.

Then, at 1622, a disconnect or release 1621 associated with the EC application 7005 is carried out, implemented by the terminal 130 and the EC system 261.

Then, at 1624, a connect or establishment 1623 associated with the EC application 7005 is implemented by the terminal 130 and the EC system 262. The target EC system 262 has the context information 1611 available and, thus, can immediately take over as host, with minimum latency.

Finally, at 1625, the user data 7005 of the EC application is communicated between the terminal 130 and the new hosting EC server 209, taking into account the context information 1611 already provided at 1613.

In the scenario of FIG. 18, the context information 1611 can be migrated from the EC system 261 to the EC system 262—even though it is not required that the EC system 261 and the EC system 262 have a trusted relationship with each other. Specifically, the inter-operability between the EC systems 261, 262 is mediated by the central control node 290. In the scenario of FIG. 18, the master control node 290 is relieved of the task of forwarding the potentially large context information 1611. Thus, control plane—user plane separation is enforced.

Although the invention has been shown and described with respect to certain preferred embodiments, equivalents and modifications will occur to others skilled in the art upon the reading and understanding of the specification. The present invention includes all such equivalents and modifications and is limited only by the scope of the appended claims.

For illustration, various scenarios have been described above with respect to selection of EC systems, e.g., in the context of an inter-EC system relocation of an EC application. Similar scenarios may also be applied to selection of local control nodes within an EC system in case an EC system includes more than one local control node.

For further illustration, above, various scenarios have been described in which the configuration response message is indicative of a single EC system. In such a scenario, the logic for EC system selection resides fully at the master control node. Other scenarios are conceivable, where the logic for EC system selection partly resides at the terminal. Here, the master control mode may transmit the configuration response message being indicative of a plurality of EC systems. Then, the terminal may select, from within the indicated plurality of EC systems, the EC system which is used for executing the EC application. For this selection, certain terminal-centric decision criteria may be applied, e.g., terminal-taken measurement values relating to, e.g., latency, quality of service, channel signal strength, etc.

For further illustration, while various examples have been described with respect to MEC, these scenarios may be generally implemented with respect to other forms of EC.

The invention claimed is:

1. A method of operating a terminal, comprising:
executing an edge computing application using a source edge computing system;
transmitting, to a master control node of an edge computing architecture, a configuration request message, the configuration request message being indicative of (1) a predicted future connectivity status of the terminal that is indicative of an access network not yet in range to become in range of the terminal and (2) a predicted future location of the terminal;
receiving, from the master control node, a configuration response message indicative of a selected edge computing system selected by the master control node from a plurality of candidate edge computing systems based at least partially on the access network to become in range as indicated in the configuration request message, and
wherein the configuration response message enables the terminal to request an inter-edge system relocation of the edge computing application from the source edge computing system to the selected edge computing system associated with the access network to become in range.

2. The method of claim 1, wherein the configuration request message is transmitted upon commencing execution of the edge computing application.

3. The method of claim 1, wherein the configuration request message is transmitted in response to a change of the at least one of the connectivity status and the location.

4. The method of claim 1, comprising:
determining said predicted future connectivity based on stored data indicative of historic connectivity or position of the terminal.

5. A method of operating a master control node of an edge computing architecture, comprising:
receiving, from a terminal, a configuration request message, the configuration request message being indicative of (1) a predicted future connectivity status of the terminal that is indicative of an access network not yet in range to become in range of the terminal and (2) a predicted future location of the terminal;
based on the configuration request message:
selecting an edge computing system from a plurality of candidate edge computing systems based on the access network indicated in the configuration request message, and
transmitting, to the terminal, a configuration response message indicative of the selected edge computing system.

6. The method of claim 5, further comprising:
updating a registry of the plurality of candidate edge computing systems based on control signaling with the plurality of candidate edge computing systems.

7. The method of claim 6, wherein the control signaling comprises at least one of: one or more supported connectivity statuses of terminals using the respective edge computing system; a location of the respective edge computing system; one or more access networks associated with the respective edge computing system; and one or more edge computing applications supported by the respective edge computing system.

8. The method of claim 5, further comprising:
receiving, from a source edge computing system, context information of an edge computing application executed by the terminal using the source edge computing system different from the selected edge computing system, and
transmitting, to the selected edge computing system, the context information.

9. The method of claim 8, wherein the context information comprises at least one of: control data of the edge computing application; user data of the edge computing application; a user context of a user of the edge computing application; and a session context of the edge computing application.

10. The method of claim 5, further comprising:
receiving, from a source edge computing system or the terminal, a token of context information of an edge computing application executed by the terminal using the source edge computing system different from the selected edge computing system, and
transmitting, to the selected edge computing system, the token.

11. The method of claim 5, comprising:
transmitting, to the selected edge computing system being the access network to become in range of the terminal, an instruction to prepare a shadow instance of an edge computing application for execution by the terminal, based on the configuration request message.

12. The method of claim 11, comprising:
providing, to the selected edge computing system, context information of said edge computing application currently executed by the terminal using a source edge computing system different from the selected edge computing system.

13. The method of claim 12, wherein providing includes:
receiving said context information from the source edge computing system, and
transmitting the context information to the selected edge computing system.

14. The method of claim 12, wherein providing includes:
receiving a token of said context information from the source edge computing system or the terminal, and
transmitting the token to the selected edge computing system.

15. The method of claim 5, wherein the edge computing system is selected further based on a preconfigured policy.

16. The method of claim 15, wherein the policy comprises a security rule or an authorization rule defining access rights to edge computing systems for a plurality of subscribers.

17. The method of claim 5, wherein at least one of the configuration request message and the configuration response message is indicative of a service identity of the edge computing application.

* * * * *